United States Patent [19]

Inoue et al.

[11] Patent Number: 5,557,707

[45] Date of Patent: Sep. 17, 1996

[54] IMAGE FORMING APPARATUS WITH A SCANNER AND METHOD OF CONTROLLING THE SAME

[75] Inventors: Yoshiya Inoue, Yokohama; Tooru Nagatsuma, Kawasaki; Kazuyuki Shimada, Tokyo; Takamasa Hayashi, Yokohama; Kunio Tomiyasu, Yokohama; Hirofumi Nishiwaki, Yokohama, all of Japan

[73] Assignee: Ricoh Company, Ltd., Tokyo, Japan

[21] Appl. No.: 421,878

[22] Filed: Apr. 14, 1995

Related U.S. Application Data

[62] Division of Ser. No. 4,569, Jan. 14, 1993, abandoned.

[30] Foreign Application Priority Data

| | | | |
|---|---|---|---|
| Jan. 16, 1992 | [JP] | Japan | 4-5604 |
| Mar. 4, 1992 | [JP] | Japan | 4-46910 |
| Jun. 17, 1992 | [JP] | Japan | 4-158015 |
| Nov. 10, 1992 | [JP] | Japan | 4-299808 |
| Dec. 24, 1992 | [JP] | Japan | 4-344515 |

[51] Int. Cl.⁶ .................................................. G06K 15/00
[52] U.S. Cl. ................................. 395/106; 395/109
[58] Field of Search .................................. 395/106, 109, 395/110, 131, 135, 149, 150, 102; 345/113

[56] References Cited

U.S. PATENT DOCUMENTS

| | | | |
|---|---|---|---|
| 4,815,009 | 3/1989 | Blatin | 395/131 |
| 4,987,447 | 1/1991 | Ojha | 355/204 |
| 5,113,491 | 5/1992 | Yamazaki | 395/141 |
| 5,274,468 | 12/1993 | Ojha | 358/448 |
| 5,309,548 | 5/1994 | Ohta et al. | 395/109 |
| 5,396,586 | 3/1995 | Van Aken | 395/141 |

*Primary Examiner*—Mark R. Powell
*Assistant Examiner*—Tracy M. Legree
*Attorney, Agent, or Firm*—Oblon, Spivak, McClelland, Maier & Neustadt, P.C.

[57] ABSTRACT

An image forming apparatus with a scanner and a method of controlling it are disclosed. Different kinds of images are combined by a simple and rapid procedure. When the scanner is connected to the apparatus, various kinds of functions available are used in an easy-to-understand and convenient way. Also disclosed are a printer with a scanner which can be readily loaded with handwritten characters, types, letterings and so forth to convert them to a font. Further, the image forming apparatus with a scanner, the method of controlling it, and the printer with a scanner are capable of easily filling a document to be prepared by the operator with a desired fill pattern, e.g., a handwritten pattern.

6 Claims, 22 Drawing Sheets

IMAGE FORMING APPARATUS WITH A SCANNER AND METHOD OF CONTROLLING THE SAME

This is a Division of application Ser. No. 08/004,569 filed on Jan. 14, 1993, now abandoned.

BACKGROUND OF THE INVENTION

1. Field of the Invention

The present invention relates to a printer, digital copier, complex machine or similar image forming apparatus with a scanner and a method of controlling it, and also to a printer capable of analyzing commands and character codes sent from a host and producing a corresponding printing or filling a figure with fill pattern data which is inputted from an image scanner.

2. Discussion of the Background

It has been customary to load data read by a scanner in an application and combine it with another kind of print data in the application. Specifically, it is a common practice with, for example, a digital copier, to develop image data from a host (or read data) in a video random access memory (VRAM), write read data or image data to be combined in the VRAM over the developed image data to thereby produce data to be written, and then sequentially transfer the combined data from the VRAM to an image forming section. Regarding a printer, when characters are to be printed in a font other than a font installed in the printer, the font of interest is usually down-loaded from a host or fed from a font cartridge or a card associated with the printer or from a disk device. Further, when it is desired to fill a polygon or a font with a pattern, use is generally made of a fill pattern installed in the printer. However, since the number of fill patterns which can be installed in the printer is limited, other desired fill patterns are registered on a host connected to the printer.

For example, Japanese Patent Laid-Open Publication No. 140796/1990 discloses a system for registering extra characters read by a scanner. Japanese Patent Laid-Open Publication No. 181784/1990 teaches a device for editing a font by reading a font with a scanner.

The conventional method of controlling an image forming apparatus with a scanner will be extremely effective when a great amount of contents should be edited, e.g., some different kinds of read data should be combined. However, the problem is that data to be written cannot be generated unless an image is developed in the VRAM at least twice, even in the event of relatively simple editing, e.g., when only part of read data should be combined. As a result, an extremely long period of time is consumed until the data has been actually printed. Moreover, many of conventional printers need disproportionate costs in obtaining font data from a font cartridge or a card or a disk. In addition, the kinds of fonts available with conventional printers are limited. On the other hand, when an original font is generated on the host and down-loaded in the printer, complicated software for editing has to be installed in the host. Besides, generating data for registering fill pattern data is time- and labor-consuming and, generally, difficult for operators to perform.

SUMMARY OF THE INVENTION

It is, therefore, an object of the present invention to provide an image forming apparatus with a scanner which can execute simple image combination in a short period of time and allows the operator to use various functions available when a scanner is connected to the apparatus easily and conveniently, and a method of controlling it.

It is another object of the present invention to provide a printer with a scanner capable of taking in handwritten characters, types and letterings and transforming them to a font with ease.

It is another object of the present invention to provide an image forming apparatus with a scanner, a method of controlling it, and a printer with a scanner which can bury a desired pattern to be filled in a document prepared by the operator.

In one aspect of the present invention, in a method of controlling an image forming apparatus with a scanner having an image reading section and an image forming section, when image data other than image data read by the image reading section is to be printed and if a document is set at a document inlet of the image reading section, the image reading section reads the document, and the image data and image data read by the image reading section are combined and then printed, In another aspect of the present invention, in a method of controlling an image forming apparatus with a scanner having an image reading section and an image forming section and operable in a set mode, a mode for combining image data to be printed and data read by the image reading section is provided, and only read data existing in a particular area set beforehand is validated and combined with the image data to be printed.

In another aspect of the present invention, in a printer with a scanner for receiving a character code, a control command, image data or similar data from a host and printing the data, image data can be inputted to the printer from a scanner connected to the printer, an image read by the scanner is registered at a storage as font data, and the font data is read out of the storage and printed in response to a character code which matches the font data and is sent from the host in the event of font selection.

In a further aspect of the present invention, a printer with a scanner for receiving a character code, a control command or similar data from a host and printing said data comprises a registering section capable of receiving image data from a scanner built in or connected to the printer and storing the image data in a storage as fill pattern data which will be used to draw graphics, and a filling section for filling a figure with the fill pattern data registered by the registering section.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
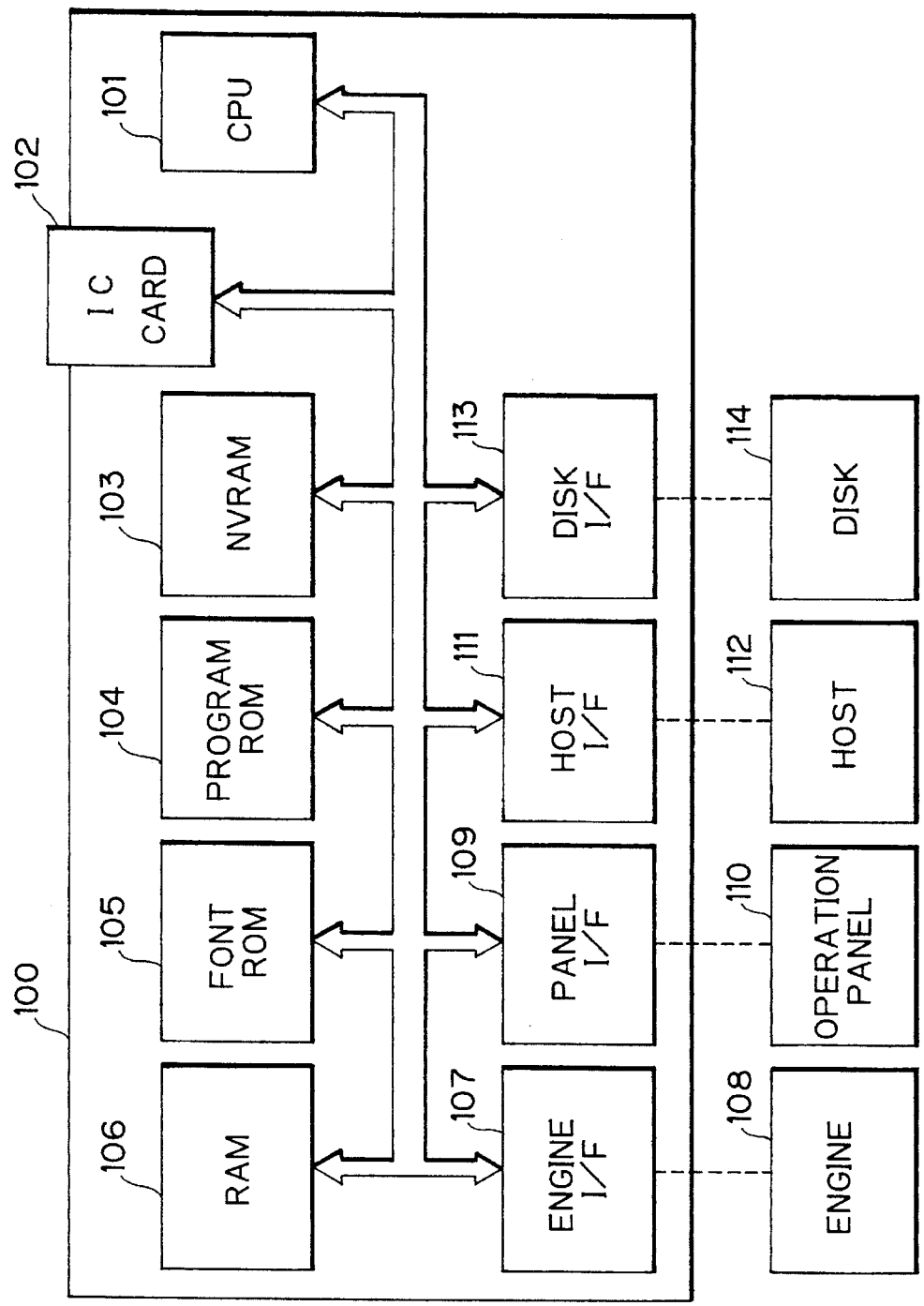
FIG. 1 is a block diagram schematically showing a controller included in an image forming apparatus with a scanner and a control method therefor embodying the present invention.

Referring to FIG. 1 of the drawings, an image forming apparatus with a scanner and a method of controlling it embodying the present invention will be described. There are shown in the figure a controller 100, a CPU (Central Processing Unit) 101 for controlling the entire controller 100, an IC (Integrated Circuit) card 102 for feeding font data and programs from the outside to the controller 100, a nonvolatile video RAM (Random Access Memory) (NVRAM) 103 for storing mode commands and other commands entered on an operation panel, a program ROM (Read Only Memory) 104 storing control programs for the controller 100, a font ROM 105 storing pattern data of fonts, a RAM 106 serving as a work memory associated with the CPU 101, an input buffer for input data, a page buffer for print data, a memory for down-loaded fonts and so forth, an engine 108 for printing data, an engine interface 107 for interchanging commands, statuses and print data with the engine 108, an operation panel 110 accessible for entering modes while reporting the states of a printer, a panel interface 109 for interchanging statuses and commands with the operation panel 110, a host 112, a host interface 111 for communicating with the host 112, a disk device 114 for storing print data and other various data, and a disk interface 113 for communicating with the disk device 114.

In operation, assume that video data generated by the controller 100 is to be printed. Then, if a document is set at a document feed position of a scanner, the controller data and scanner data are printed in combination; if otherwise, the controller data is directly printed. Specifically, to combine scanner data with controller data, the operator should only set, at the time of printing the page to be combined, a desired document at the document feed position of the scanner. When one page of print data is completed, the controller 100 sends a print data output request to the engine 108 via the engine interface 107. In response, the engine 108 determines whether or not a document is set by a paper transport control section, not shown. If a document is set, the engine 108 sends a permission to the controller 100, receives video data from the controller 100 in synchronism with the start of a document reading operation, and combines the controller data with scanner data.

To enter a plurality of pages of characters in a table having a given format, the table is fed from the scanner while the characters matching the table are generated by a host computer. The resulting host data are transferred to the controller 100. As a result, the video data developed in the controller 100 and the video data representative of the table and read by the scanner are printed in combination. After the document his been read, it is again set at the document feed position of the scanner by the operator. The second page and successive pages are not printed until the document has been set again. This kind of usage will be effected when the consecutive pages of documents are repetitively used or when documents are set at the document feed position one page at a time and the controller data are representative of a plurality of consecutive pages.

When several pages of print data exist in the controller 100 and can be sequentially fed to the engine 108, the controller 100 sands a print data output request to the engine 108. In response, the engine 108 determines whether or not a document is set. If a document is set, the engine 108 starts on a composite printing operation while synchronizing the controller 100 and scanner; if otherwise, it does not send a permission to the controller 100 until a document has been set.

Assume that the operator desires to insert pictures in the first and third pages under the presence of five pages of control data. Then, in the event of generating five pages of data, the host 112 craters an escape sequence indicative of the composite printing with the scanner in the print data of the first and third pages. The resulting five pages of print data are transferred from the host 112 to the controller 100. Then, the controller 100 develops the received data as video data. Before sending an output request associated with the first page, the controller 100 sends to the engine 108 data indicating that the page to be sent should be combined with scanner data. On receiving such data, the engine 108 determines whether or not a document is set and, if it is set, sends a permission to the controller 100 and then starts printing the data. For the second page, an output request is sent from the controller 100 to the engine 100, a permission is returned from the engine 108 to the controller 100, and then printing is effected. The third page will be processed in the same manner as the first page while the fourth and fifth pages will be processed in the same manner as the second page.

Figure 2:
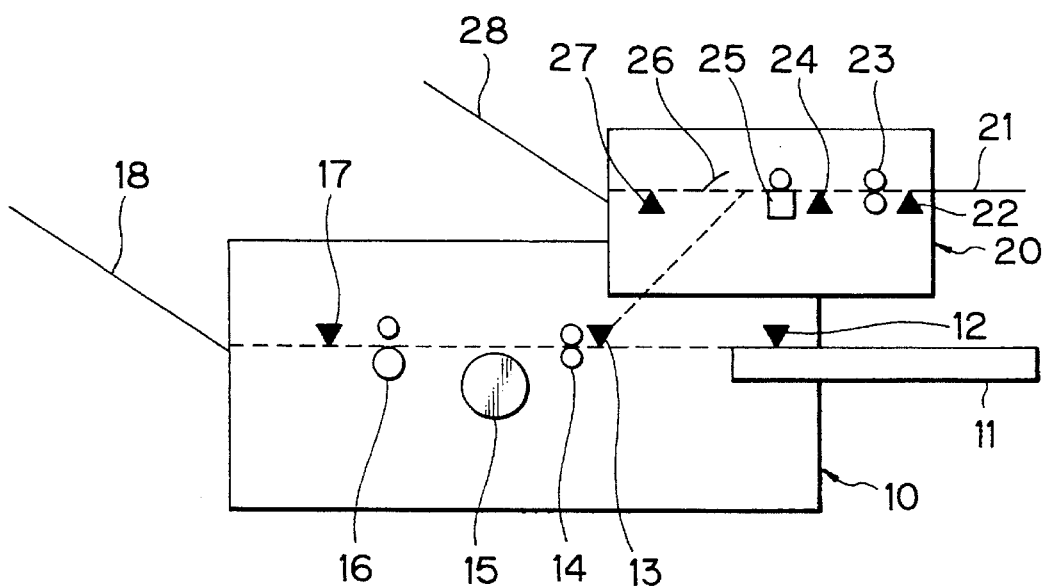
FIG. 2 is a view showing an essential part of an alternative embodiment of the image forming apparatus and control method in accordance with the present invention.
Figure 3:
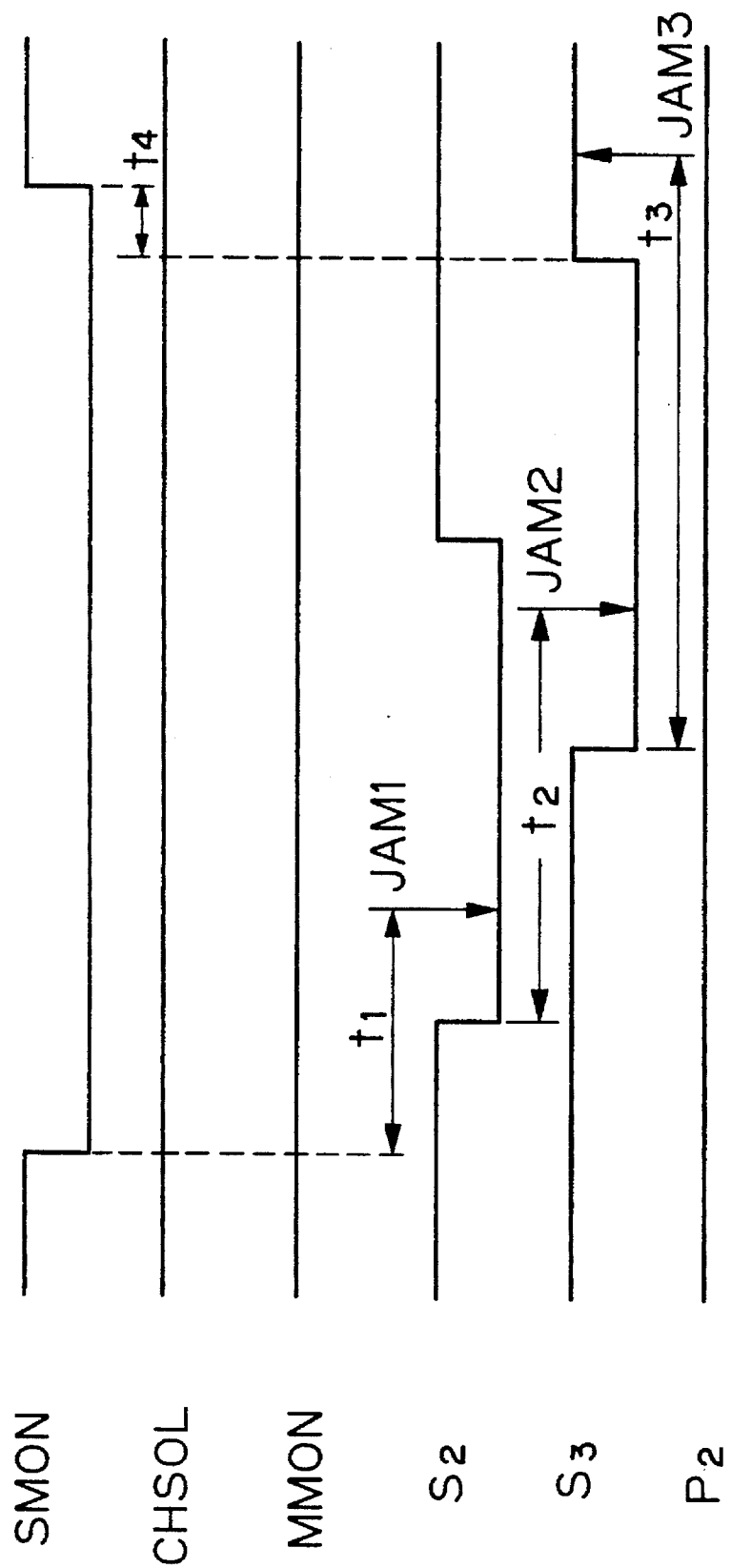
FIG. 3 is a timing chart representative of an image read mode (scanner mode) particular to the embodiment of FIG. 2.
Figure 4:
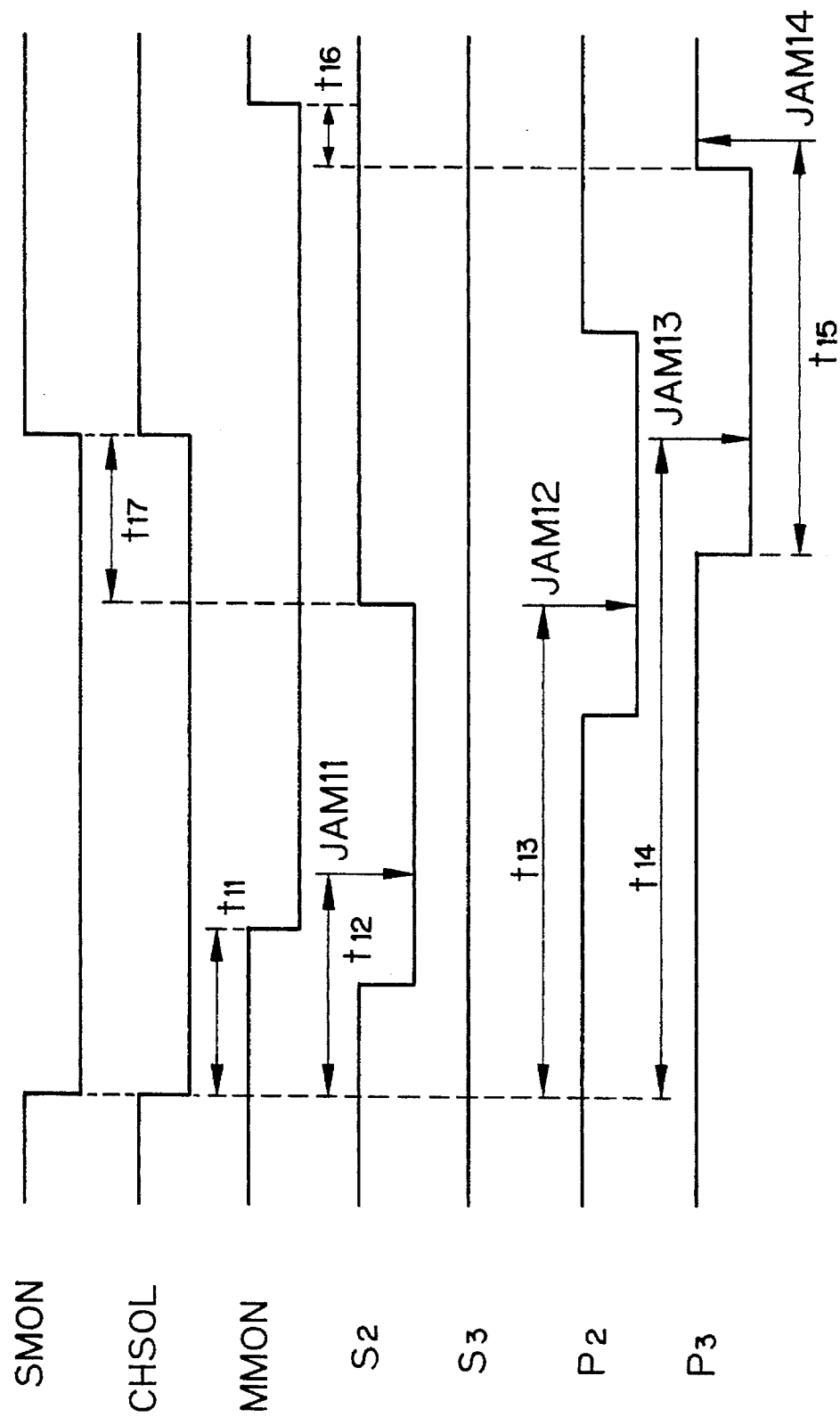
FIG. 4 is a timing chart representative of an image form mode (printer mode) also particular to the embodiment of FIG. 2.

An alternative embodiment of the present invention will be described and also implemented with the controller 100 shown in FIG. 1. FIG. 2 shows an essential part of the image forming apparatus representative of the alternative embodiment. As shown, the apparatus has an image forming section 10 including a paper cassette 11, a paper end sensor 12, a register sensor 13, a register roller 14, a photoconductive element 15, a fixing unit 16, and a paper discharge sensor 17. The reference numeral 18 designates a paper tray. An image reading section 20 has a document set (and paper feed) tray 21, a document set (and paper end) sensor 22, a feed roller 23, a head sensor 24, a read head 25, a path selector in the form of a pawl 26, a document discharge sensor 27, and a tray 28 for receiving discharged documents. FIGS. 3 and 4 show respectively operation timings in an image read mode (scanner mode) and an image form mode (printer mode) particular to the embodiment.

Figure 5:
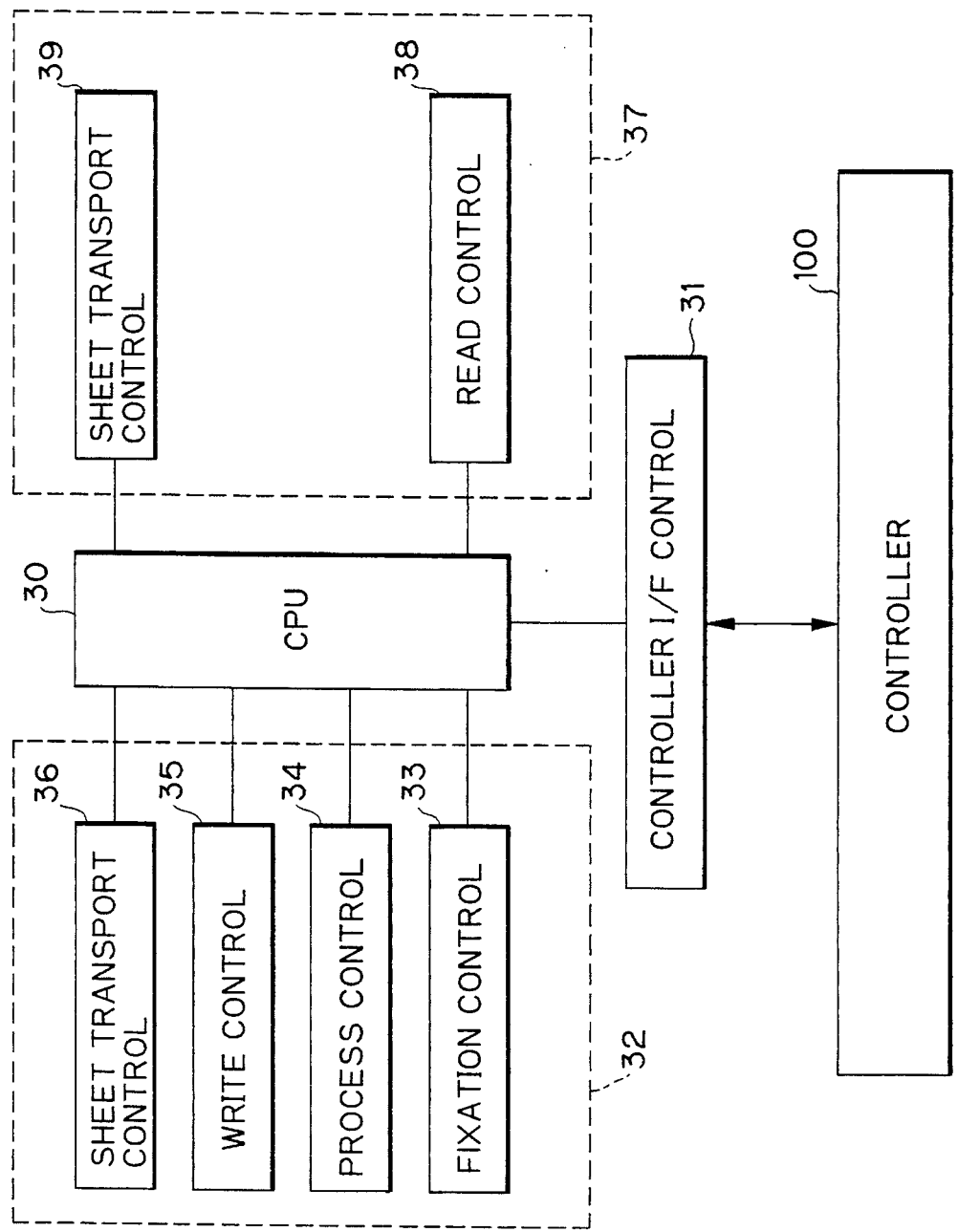
FIG. 5 is a block diagram schematically showing a control system included in an engine of the same embodiment.

FIG. 5 schematically shows a control system included in the engine 108 of the embodiment. There are shown in FIG. 5 a CPU 30, the controller 100, a controller interface control section 31, and an image forming section 32. The image forming section 32 has a fixation control section 33, a process control section 34, an optical write control section 35, and a paper transport control section 36. An image reading section 37 has a read control section 38 and a paper transport control section 39.

Figure 6:
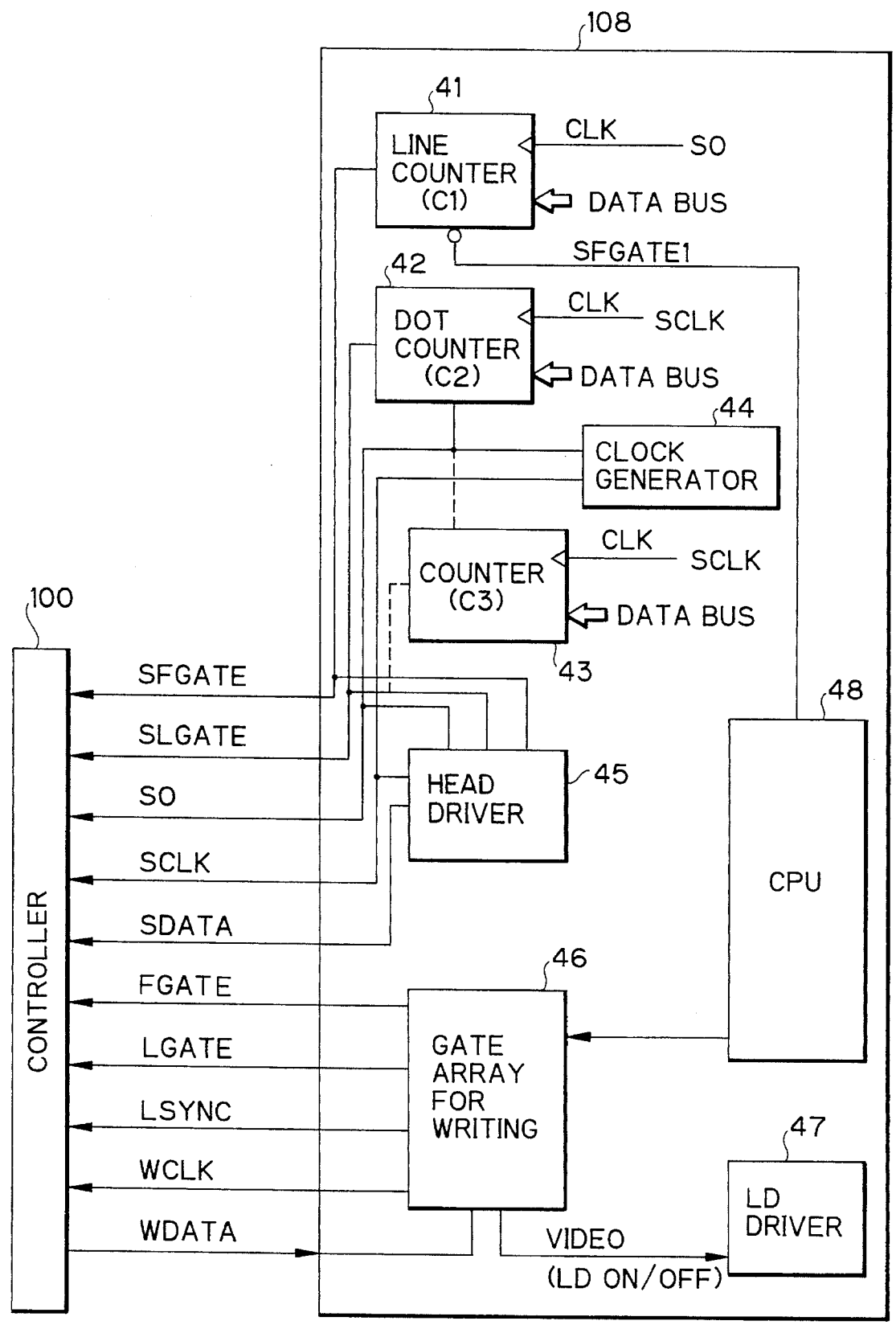
FIG. 6 is a block diagram schematically showing a video control system also included in the engine.
Figure 7:
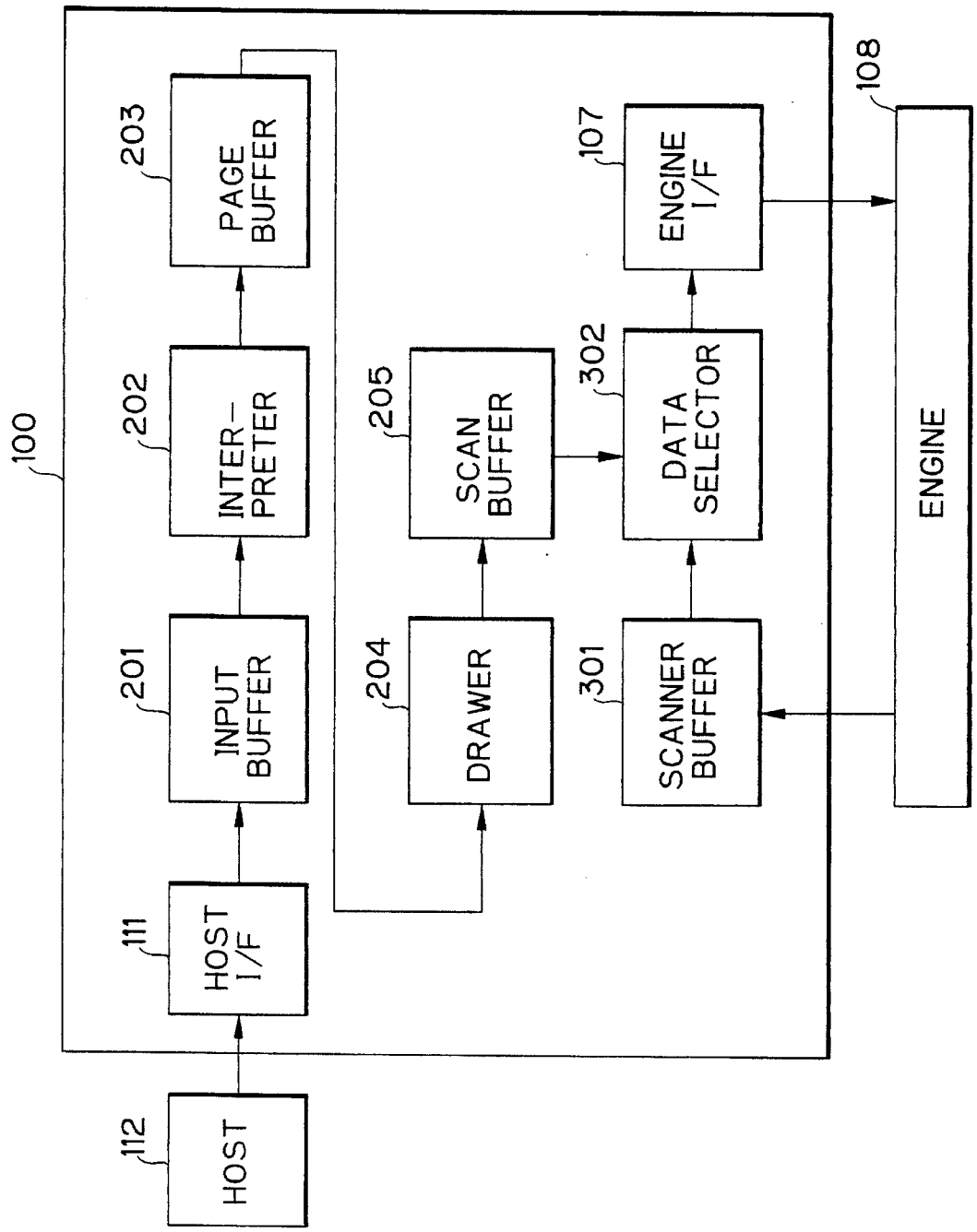
FIG. 7 shows the flow of data in a controller included in the embodiment.

A video control circuit included in the engine 108 of this embodiment is shown in FIG. 6 in detail. As shown, the video control circuit has a line counter 41 (subscan counter $C_1$), a dot counter 42 (main scan counter $C_2$), a counter 43 ($C_3$), a clock generator 44, a head driver 45, a gate array 46 for optical writing, an LD (Laser Diode) driver, and a CPU 48. FIG. 7 shows how data flown in the controller 100 of the illustrative embodiment. There are shown in FIG. 7 the controller 100, the engine interface 107, the engine 108, the host interface 111, the host 112, an input buffer 201, an interpreter 202, a page buffer 203, a drawer 204, a scan buffer 205, a scanner buffer 301, and a data selector 302.

Figure 9:
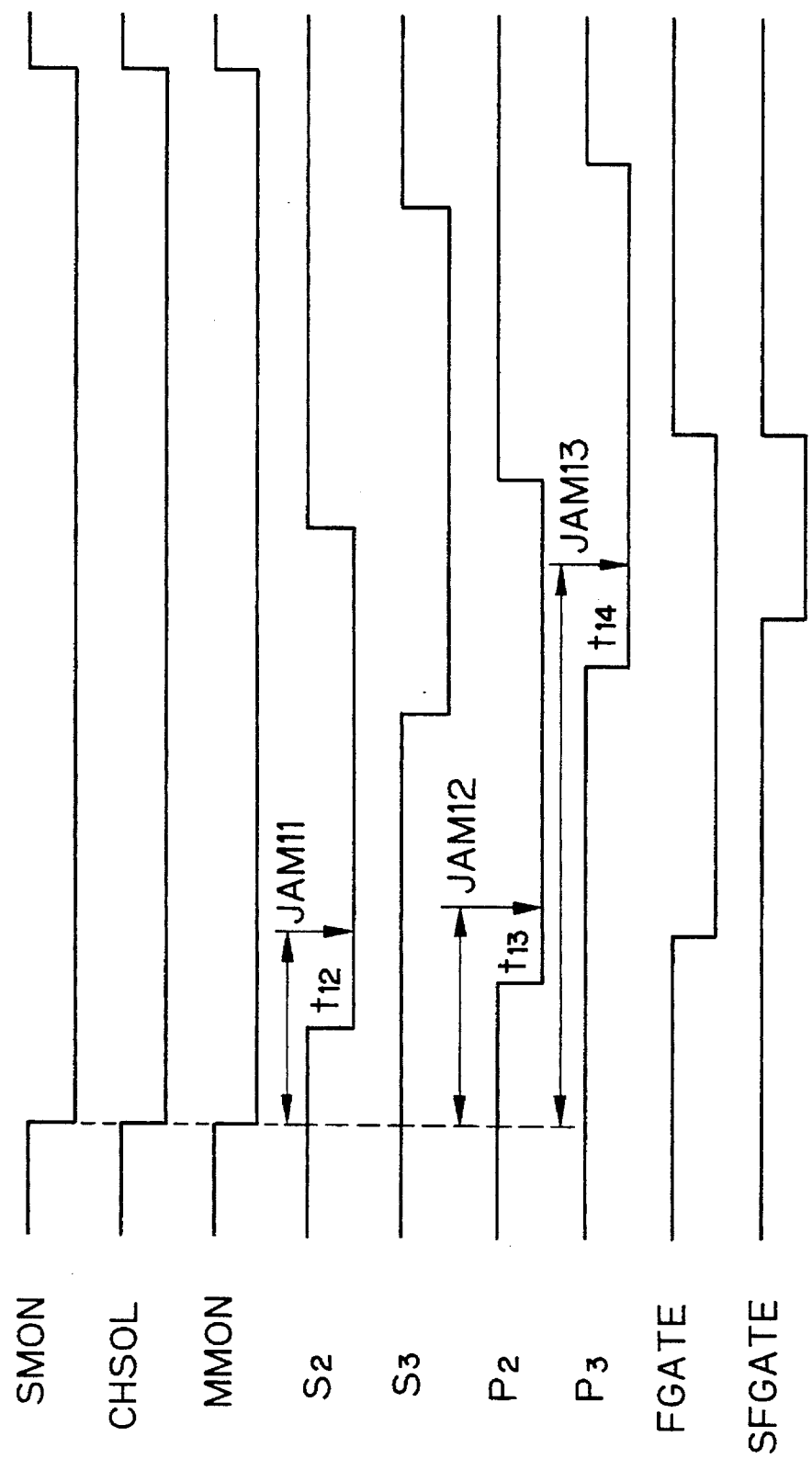
FIG. 9 is a timing chart associated with FIG. 8.
Figure 10B:
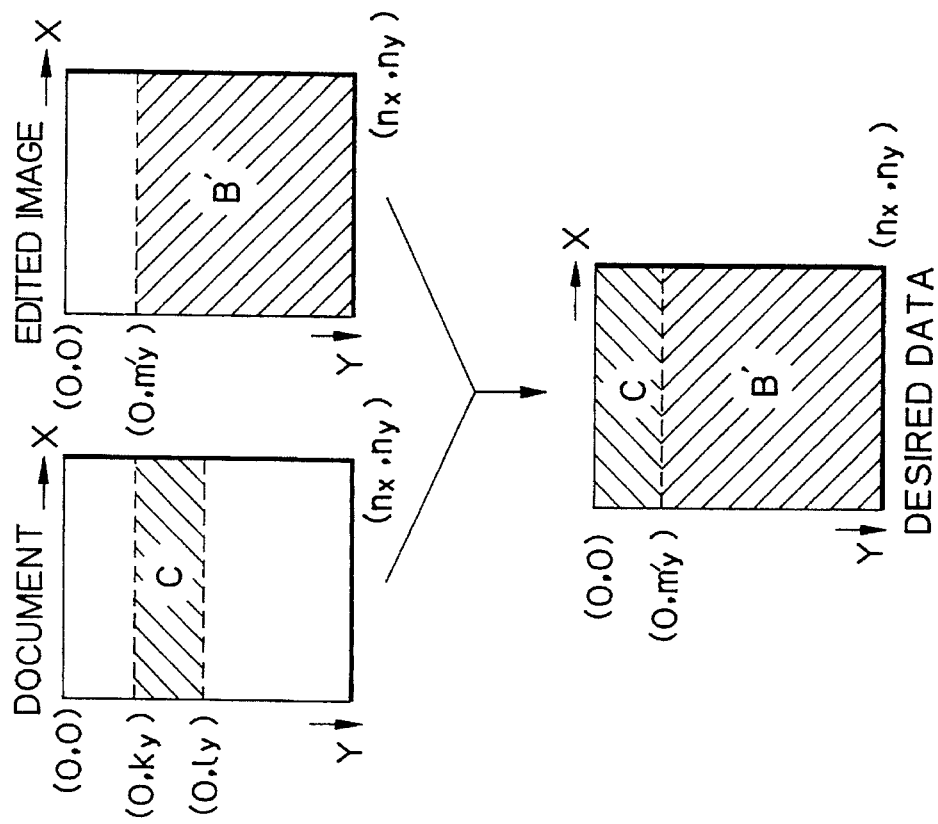
FIGS. 10A and 10B demonstrate how to combine the desired part of the document and the image edited on a word processor in a desired position.
Figure 10A:
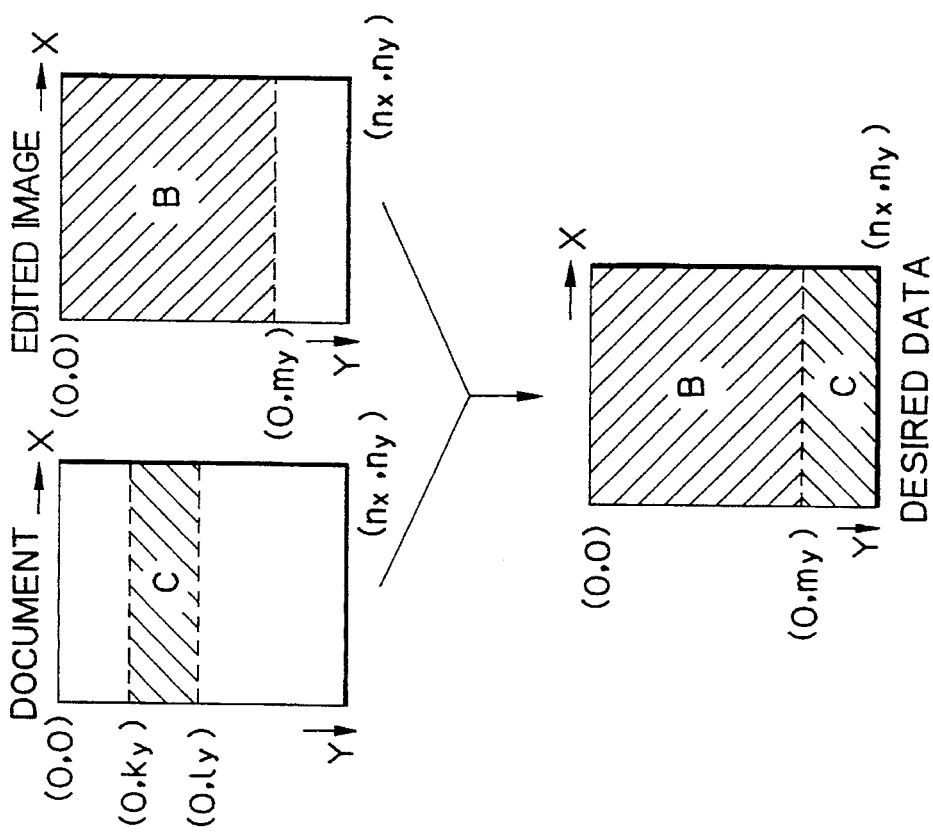
Figure 11:
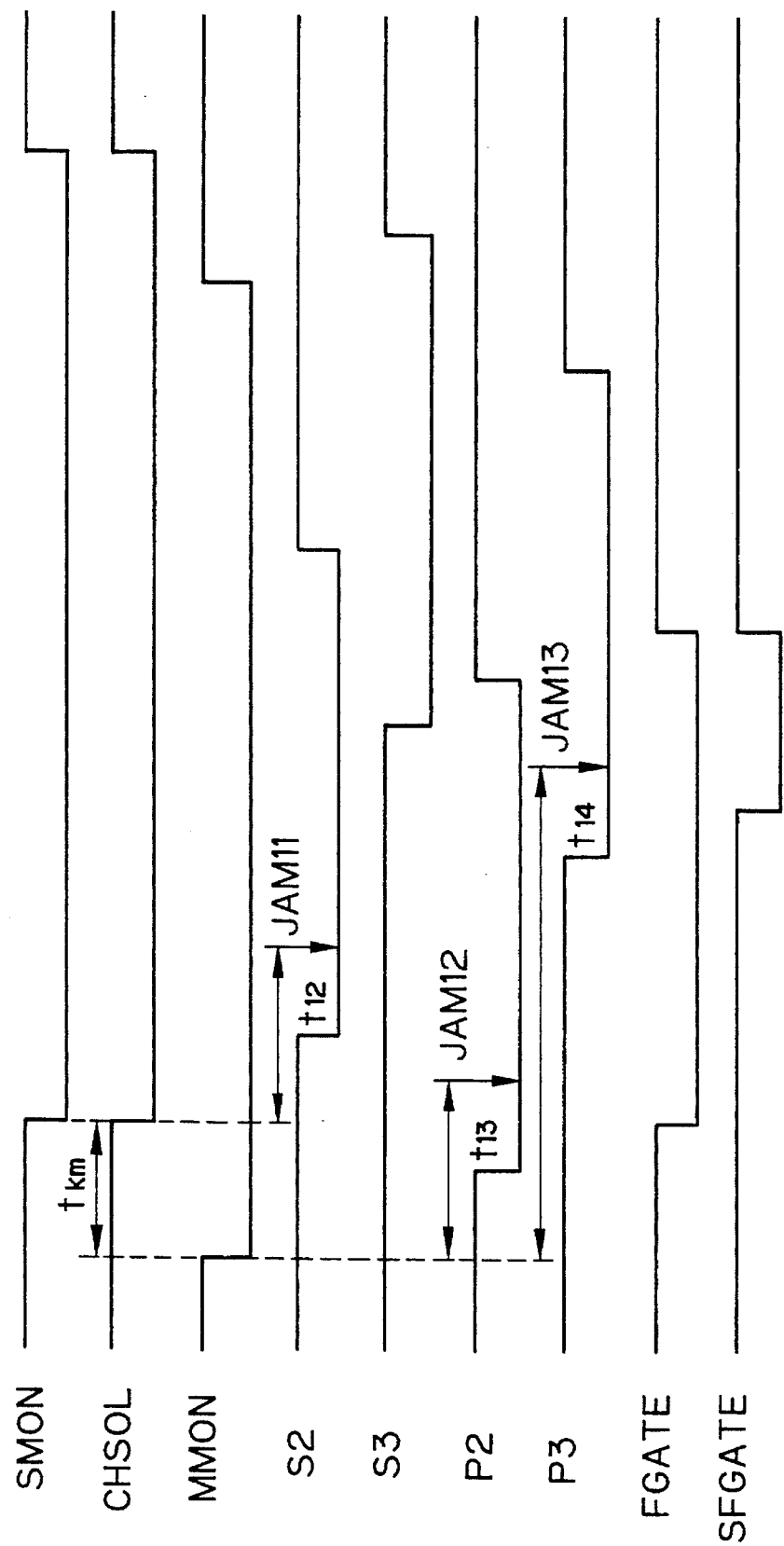
FIG. 11 is a timing chart associated with FIG. 11.
Figure 12:
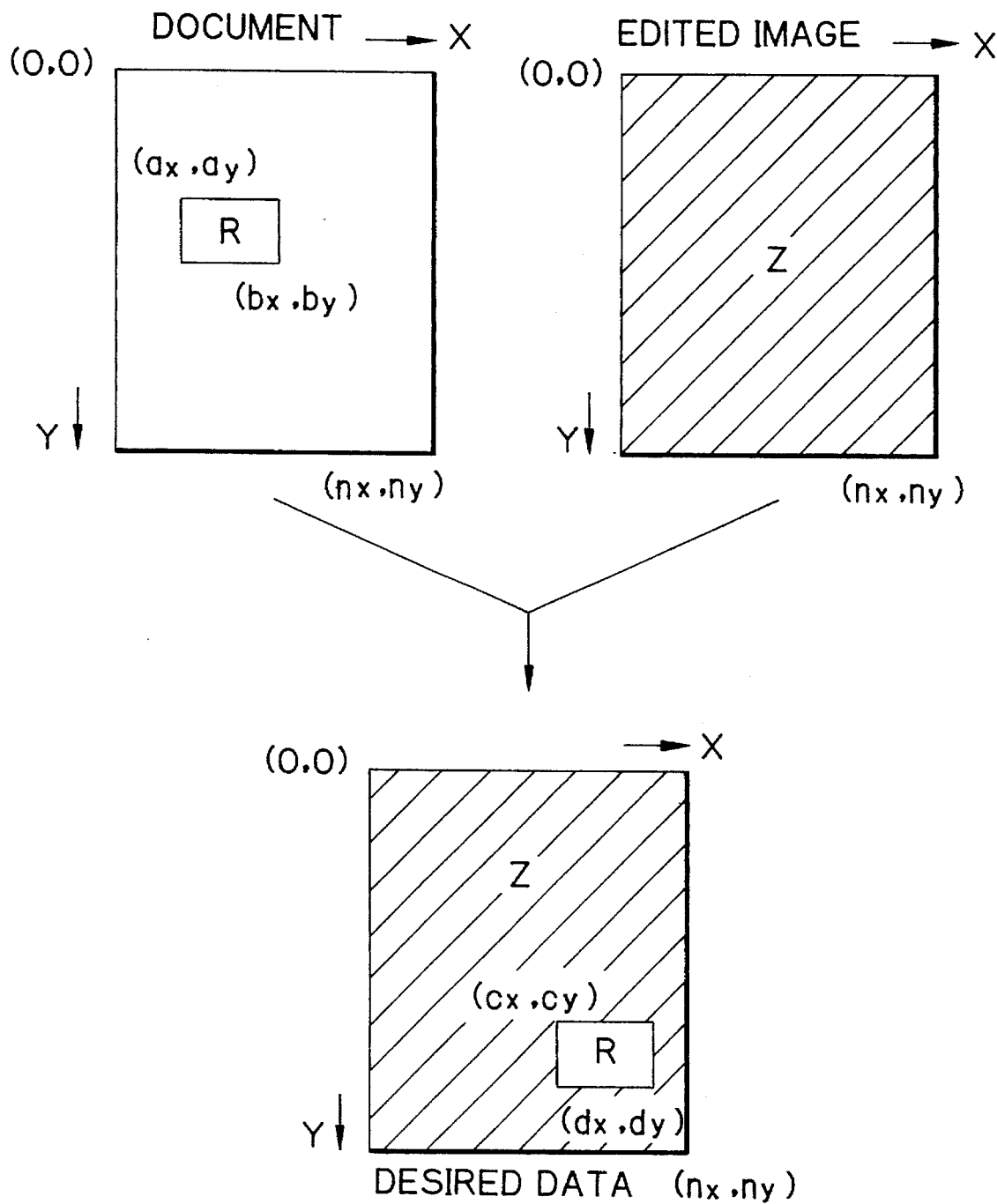
FIG. 12 indicates how to combine the two kinds of images in a desired position in the main scanning direction.
Figure 13:
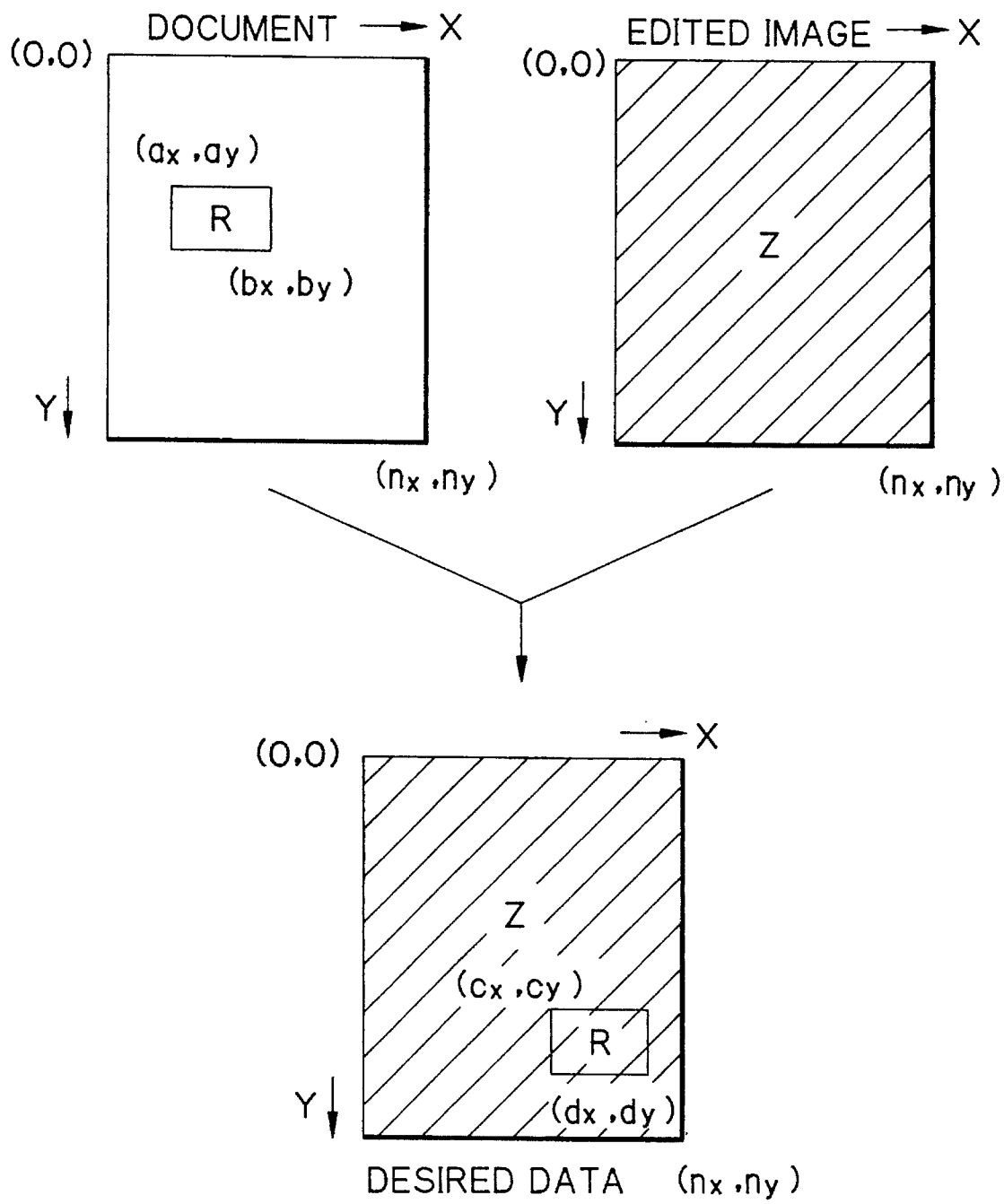
FIG. 13 shows how the data read out of the document and the data edited by the word processor are ORed.
Figure 14:
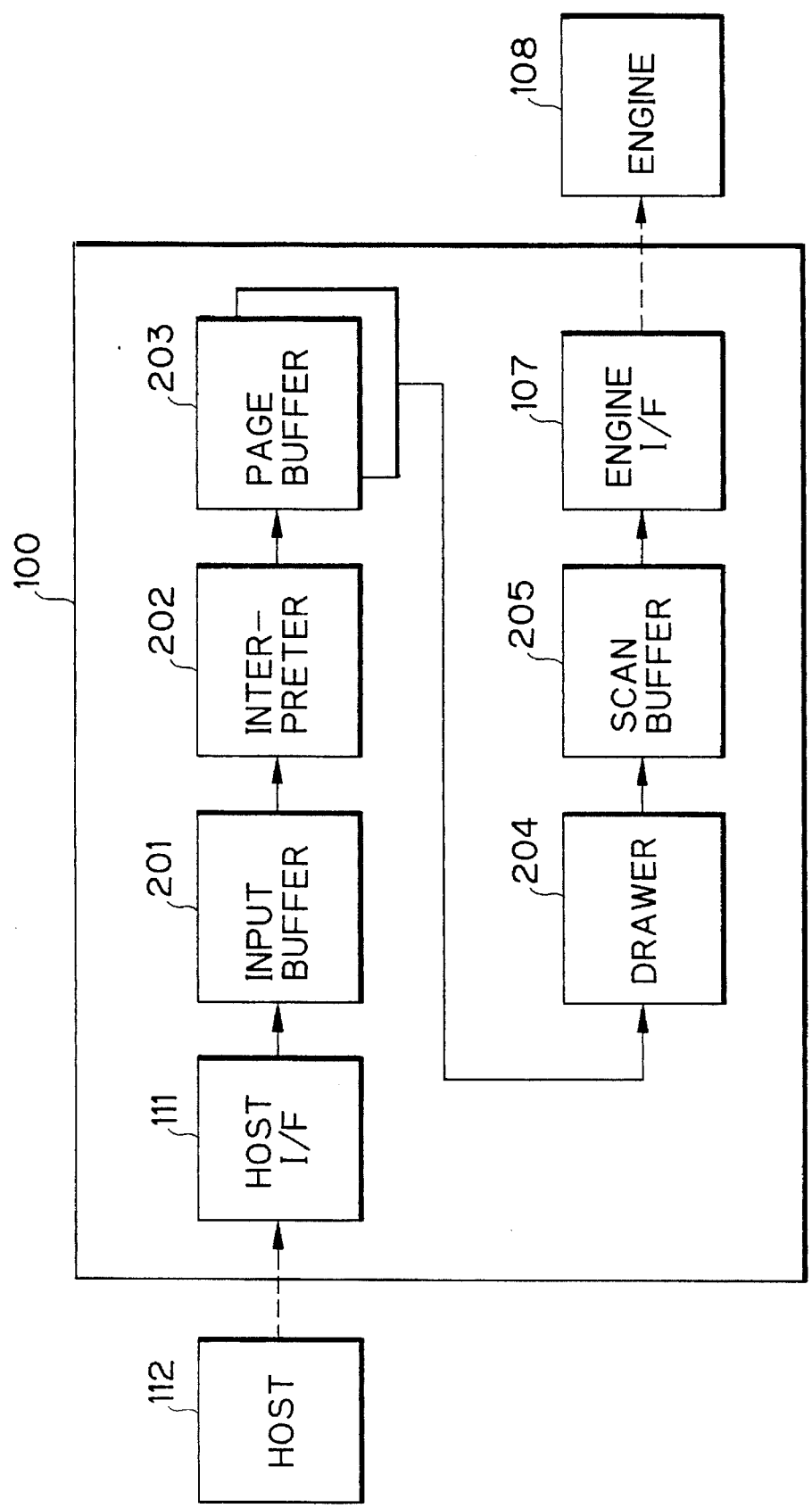
FIG. 14 shows the flow of controller data in a conventional image forming apparatus with a scanner.

FIGS. 8, 10A, 10B, 12 and 13 demonstrate a specific procedure for producing desired data by combining a document and an edited image. FIGS. 9 and 11 show respectively the operation timings of FIG. 8 and those of FIG. 10. FIG. 14 is representative of the flow of data in a controller built in a conventional image forming apparatus with a scanner.

The alternative embodiment having the above construction will be operated as follows. In this embodiment, the image reading section and the image forming section are controlled independently of each other. The image forming section uses a conventional electrophotographic process. As shown in FIG. 2, in a printer mode, a paper is fed from the document set (and paper feed) tray 21, steered by the path selector 26 toward the image forming section 10, and then stopped by the register roller 14. The register roller 14 is caused to rotate in synchronism with a latent image formed by optical writing. Thereafter, the paper is driven out to the tray 18 by the conventional electrophotographic process. This is also true when a paper is fed from the cassette 11. In a scanner mode, a document is fed from the document set tray 21. The head 25 starts reading the image of the document on the elapse of a predetermined period of time after the document has moved away from the head sensor 24. Then, the document is driven out to the document discharge tray 28 by the path selector 26.

An image read mode will be described with reference to FIG. 3. On receiving a read command from the controller, the image reading section determines whether or not a document is present by the document set sensor 22, FIG. 2. Since an image read mode is set up, a path select signal CHSOL is switched to a high level (usually high) so as to steer the document to the discharge tray 28. At the same time, a transport motor SMON included in the image reading section is switched to a low level to start transporting the document. If the input $S_2$ to the head sensor 24 remains in a high level even after the elapse of a period of time $t_1$, meaning that the document has failed to reach the head sensor 24, it is determined that a jam JAM 1 has occurred. Then, the drive is interrupted. Likewise, if the input $S_3$ to the document discharge sensor 28 remains in a low level on the elapse of a period of time $t_2$ after the signal $S_2$ has gone low or if the signal $S_3$ does not go high on the elapse of a period of time $t_3$ after it has gone low, a jam JAM2 or JAM3 is detected to interrupt the drive. The document being transported is read by the head 25 on the elapse of a predetermined period of time after it has moved away from the head sensor 24. Subsequently, since the signal CHSOL is in a high level, the document is transported upward in FIG. 2. After the trailing edge of the document has moved away from the document discharge sensor 27, i.e., after the signal $S_3$ has gone high, the document is determined to have reached the discharge tray 28 on the elapse of a period of time $t_4$. Then, the motor SMON is switched to a high level, i.e., deenergized. In the figure, labeled MMON and $P_2$ are respectively a transport motor included in the image forming section and the input to the resister sensor 13.

As shown in FIG. 4, in an image form mode, the path select signal SMON is switched to a low level in response to an image form command from the controller, thereby switching the transport path downward in FIG. 2. At the same time, the motor SMON is brought to a low level to start on transport. If individual sheets do not arrive at the associated sensors at times $t_{12}$, $t_{13}$ and $t_{14}$, it is determined that jams JAM11, JAM12 and JAM 13 respectively have occurred. Then, all the operations are interrupted. On the elapse of a time $t_{11}$ after the signal SMON has gone low, the motor MMON is switched to a low level to thereby turn on the drive of the image forming section, on the assumption that a paper has reached the image forming section 10, FIG. 2. On the elapse of a time $t_{17}$ after the input $S_1$ to the head sensor 24 has gone high, the signals SMON and CHSOL are each switched to a high level to interrupt the drive, on the assumption that a document is absent at the image reading section 20. When the input $P_3$ to the paper discharge sensor 17 goes high in a predetermined period of time (within $t_{15}$), the motor MMON is deenergized on the elapse of period of time $t_{16}$. Then a sequence of image forming steps is completed.

As shown in FIG. 7, the controller 100 of the embodiment receives print data from the host 112 via the host interface 111. The data is once stored in the input buffer 201 which is of FIFO (First-In First-Out) type. The interpreter 202 interprets the data stored in the input buffer 201 to produce various kinds of commands, whereby the page buffers 203 are constructed. The page buffers 203 are capable of preparing a plurality of pages beforehand on the basis of the capacity of the RAM 106, FIG. 1, and asynchronous to the printing operation. The drawer 204 reads the data of the page buffers 203 having been constructed one after another, interprets character codes or graphic commands, and generates print image data in the scan buffer 205. The scan buffer 205 is implemented as a memory capable of storing one page of pixels. The procedure up to the generation of print image data in the scan buffer 205 is the same as in a conventional flow, FIG. 14. The difference is that the embodiment writes data from the scanner in the scanner buffer 301 and, if data exists in the scanner, transfers the data of the scanner buffer 301 to the engine interface 107 via the data selector 302. If data does not exist in the scanner, the embodiment reads out the data of the scan buffer 205 via the data selector 302 in response to a synchronizing signal from the engine 108 while transferring them to the engine 108.

Figure 8:
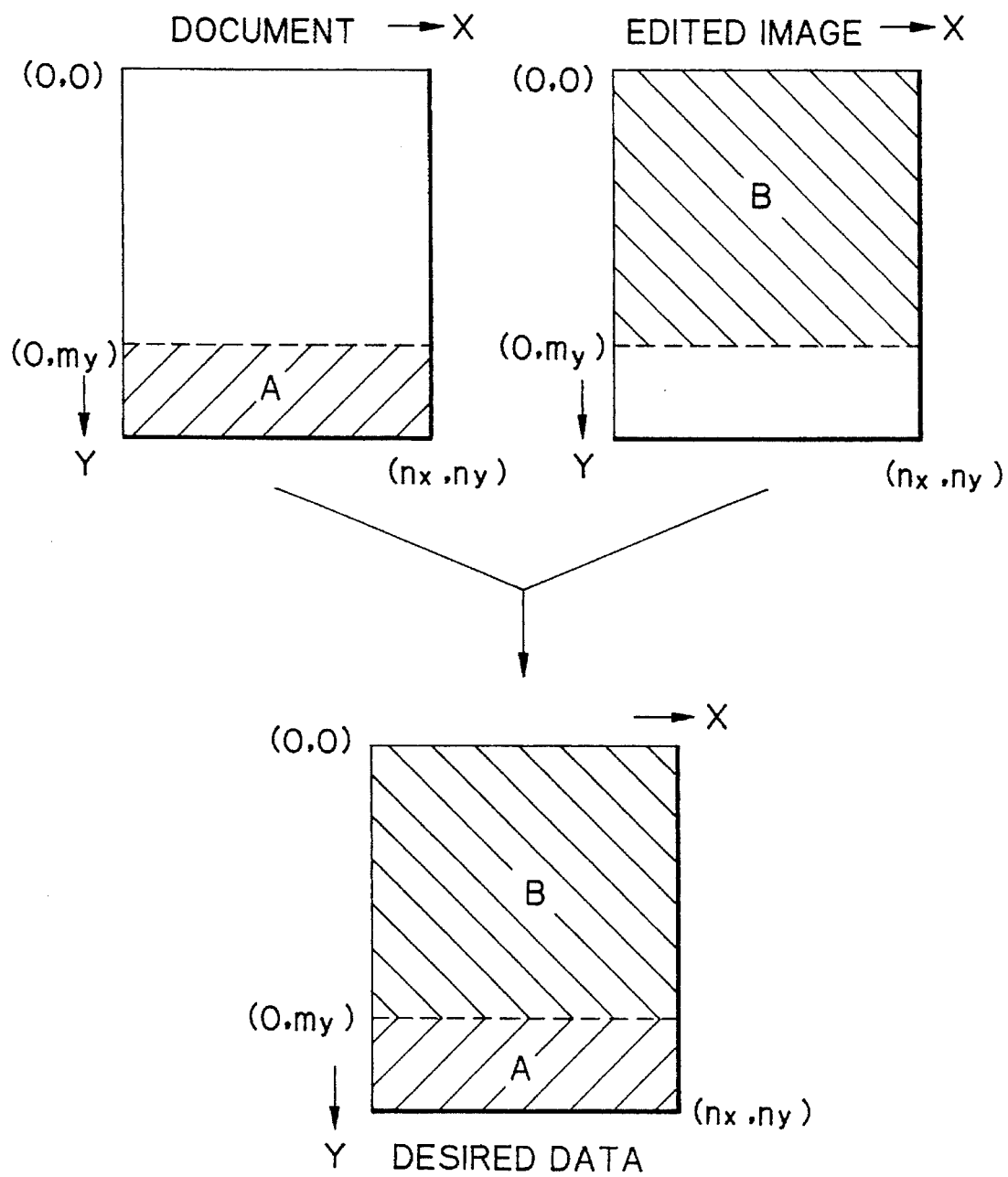
FIG. 8 demonstrates how to combine a desired part of a document and an image edited on a word processor when the desired part of the document is to be printed in the same position a paper.

As shown in FIG. 8, assume that the operator desires to combine the area A of the document and the area B of an image edited on a word processor. Then, the operator specifies the area A of the document on the host (word processor in this case). On receiving this data, the controller 100 determines from which line to which line the marked area extends as counted from the leading edge of the document (lines $m_y$ to $n_y$), and then reports it to the engine 108 via the engine interface 107. In response, the CPU 48, FIG. 6, of the engine 108 sets the data $m_y$ and $n_y$ in the line counter ($C_1$) 41. In response to a start command from the controller 100, the CPU 48 effects the transport of a document and a paper and then turns on a write subscan valid width signal (FGATE) and a read subscan valid width signal (SFGATE 1) at a predetermined time. While the signal FGATE is immediately sent to the controller 100, a signal SFGATE is sent on the elapse of a period of time corresponding to the $m_y$ lines after the turn-on of the signal SFGATE1. On receiving the signal SFGATE, the controller 100 processes read data SDATA in place of print data having been sent from a VRAM and sends the resulting data as write data SDATA. When the line counter ($C_1$) 41 fully counts the lines up to the line $n_y$, it turns off the signals SFGATE1 and SFGATE. The timing chart of FIG. 9 is representative of the above-described procedure.

While the above description has concentrated on the combination in the subscanning direction, the same effect is achievable even in the main scanning direction or in the combination of main and subscanning directions if use is made of the dot counter ($C_2$) 42 and a main scan valid width signal SLGATE. In FIG. 6, there are shown a read line synchronizing signal SO, a clock CLK, a read clock SCLK, a write clock WCLK, a write subscan valid width signal LGATE, a write synchronizing signal LSYNC, and a data bus line DATA BUS.

The above description has assumed that the position of data to be read on a document and the position thereof on a paper are identical. Hereinafter will be described a procedure for combining a desired part of document data in a desired position on a paper. As shown in FIG. 10A, assume that the operator desires to print the area C of a document at a position below the area B of an image edited on the word processor. Then, the operator specifies the area below the area B where the area C should be located on the word processor or host. On receiving this data, the controller 100 determines from which line to which line of the document the area C extends as counted from the leading edge of the document (lines $k_y$ to $l_y$), and then reports it to the engine 108. Also, the controller 100 informs the engine 108 of the position for printing the area C of the document (lines $m_y$ to $n_y$). The CPU 48, FIG. 6, of the engine 108 recognizes that the lines $k_y$ and $m_y$ are different, sets $k_y$ and $l_y$ in the counter ($C_1$) 41, FIG. 6, and then subtracts $k_y$ from $m_y$ to produce $t_{km}$. On receiving a start command from the controller 100, the CPU 48 turns on a main motor, i.e., switches the motor MMON to a low level to transport a paper, as shown in FIG. 11. Subsequently, on the elapse of $t_{km}$, the CPU 48 turns on the motor of the image reading section, i.e., switches the motor SMON to a low level to transport a document. Assuming that the area C of the document is to be printed above the area B of the edited image, as shown in FIG. 10B, then the transport of a paper will begin on the elapse of $t_{km}$ after the start of transport of the document. When a predetermined period of time elapses, the CPU 48 turns on the write subscan valid width signal FGATE and read subscan valid width signal SFGATE. However, the time for turning on the signal SFGATE differs from the case wherein the position on the document and the position on the paper are identical (FIG. 9).

Again, while the above description has concentrated on the combination in the subscanning direction, the same effect is achievable even in the main scanning direction or in the combination of main and subscanning directions if use is made of the dot counter ($C_2$) 42 and a main scan valid width signal SLGATE. This is shown in FIG. 12 specifically. In such a case, the prerequisite is that the counter ($C_3$) be additionally included in the video control circuit, FIG. 6, to distinguish the SLGATE to be fed to the controller 100 from the signal to be sent to the head driver 45. In FIG. 12, $a_y$ and $b_y$ are set in the line counter (subscan counter) ($C_1$), $a_y$ is subtracted from $c_y$ to produce $t_{ca}$, and the above-described control is executed with $t_{ca}$. On the other hand, main scanning is implemented by setting $c_x$ and $d_y$ in the dot counter (main scan counter) ($C_2$) and $a_x$ and $b_x$ in the counter ($C_3$). Further, as shown in FIG. 13, it is also easy to OR the data edited on the word processor and the data read out of a document.

Figure 15:
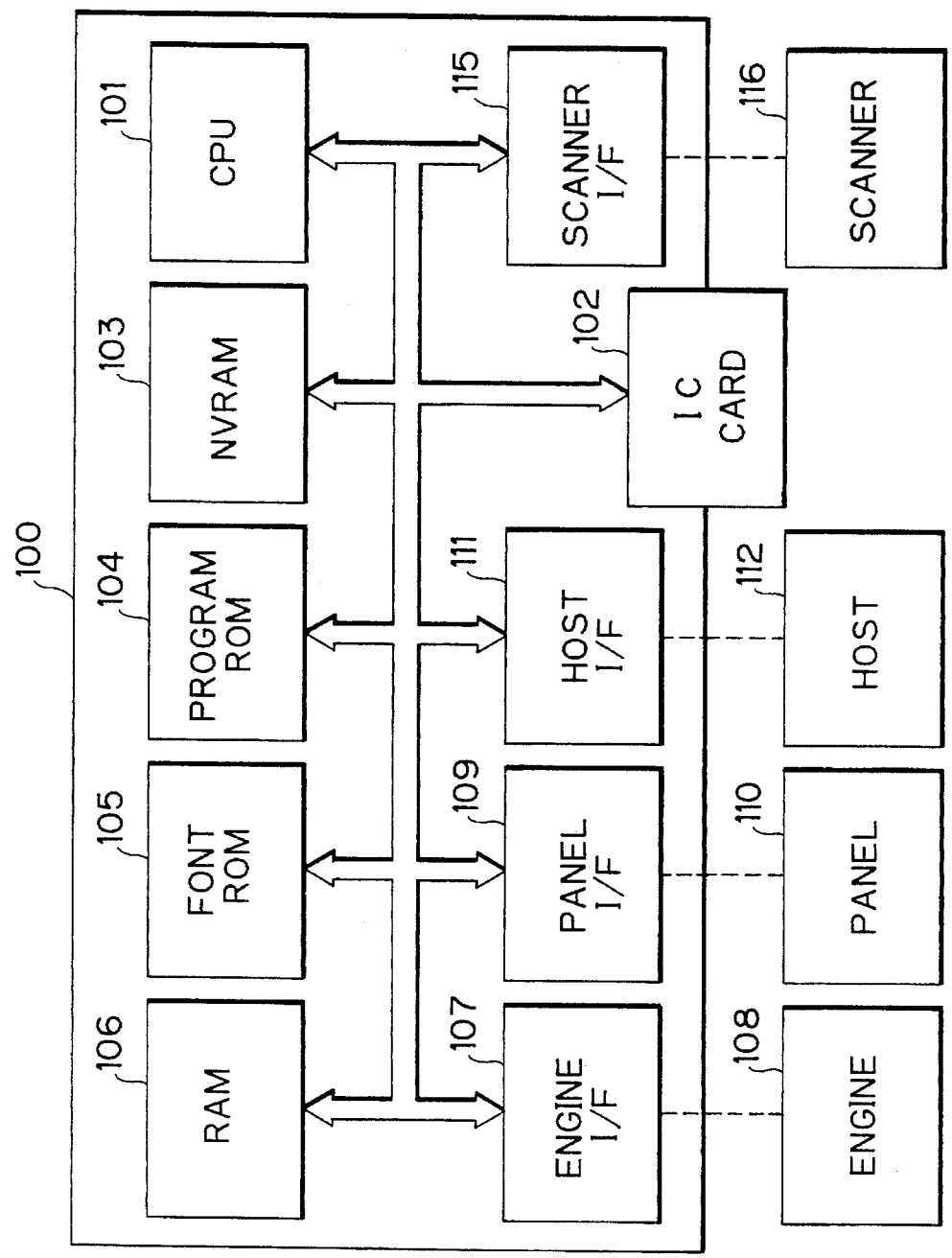
FIG. 15 is a block diagram schematically showing a controller included in a printer with a scanner embodying the present invention.

A printer with a scanner in accordance with the present invention will be described hereinafter. FIG. 15 schematically shows a controller included in a printer with a scanner embodying the present invention together with equipment associated therewith. In FIG. 15, the same constituents as those shown in FIG. 1 are designated by like reference numerals, and a detailed description will not be made to avoid redundancy. The printer includes a scanner 116 and a scanner interface 115 for interchanging commands and statuses with the scanner 116 and receiving bit image data from the scanner 116.

Figure 16:
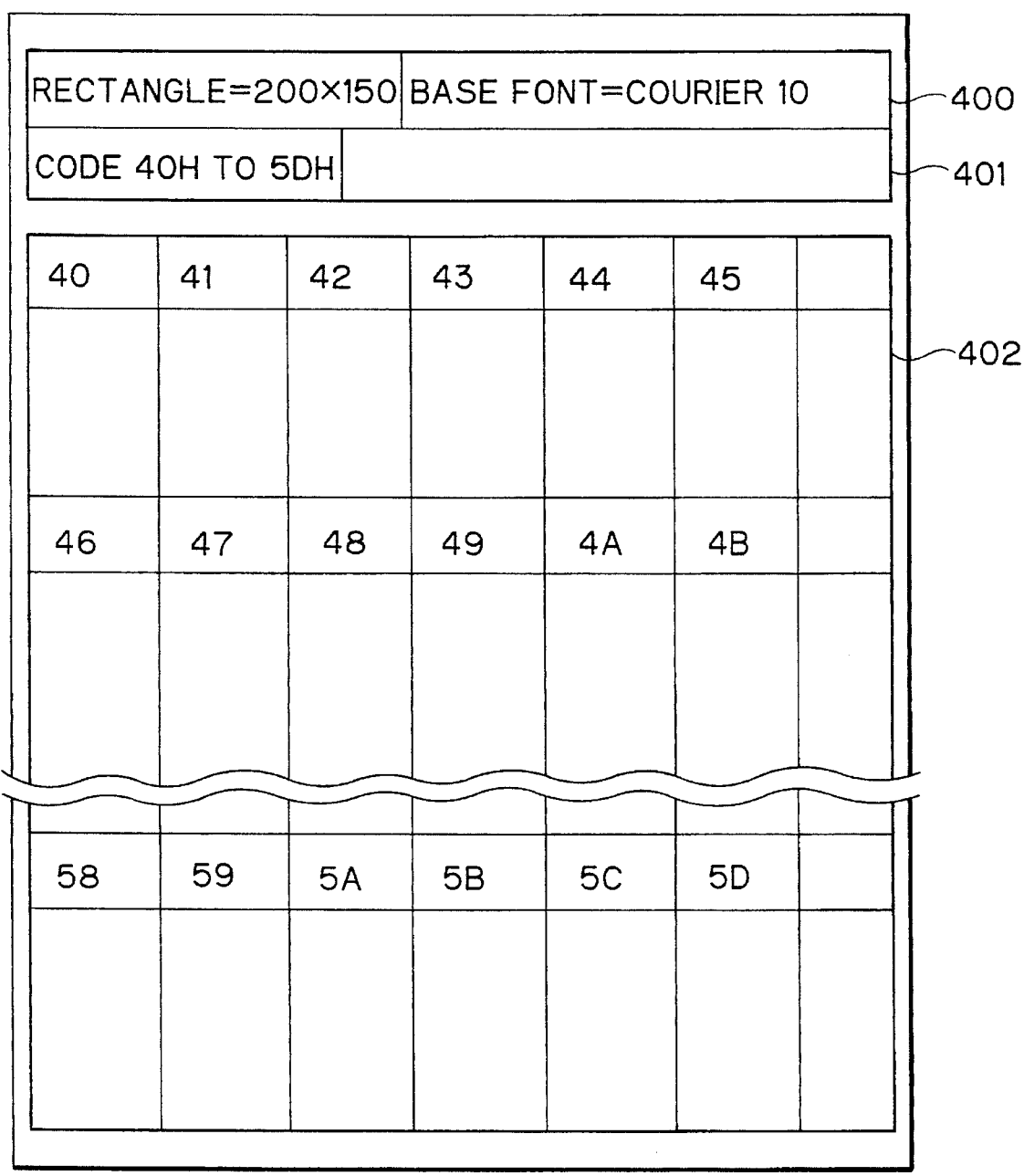
FIG. 16 shows a specific document on which a font registration format is printed in accordance with the embodiment of FIG. 15.

FIG. 16 shows a document having a specific font registration format applicable to the embodiment. In the figure, the reference numeral 400 designates the edges of the document. The format includes an attribute recording area 401 surrounded by rules and allowing various attributes, e.g., a character pattern area size (RECTANGLE), a base font name (BASE FONT) and a character code range (CODE) to be recorded therein. The format also has a character pattern data recording area 402 also surrounded by rules (a character code is printed above each character pattern portion). Assume that characters shown in the frames of the format were printed by an optical character reader (OCR).

Figure 17:
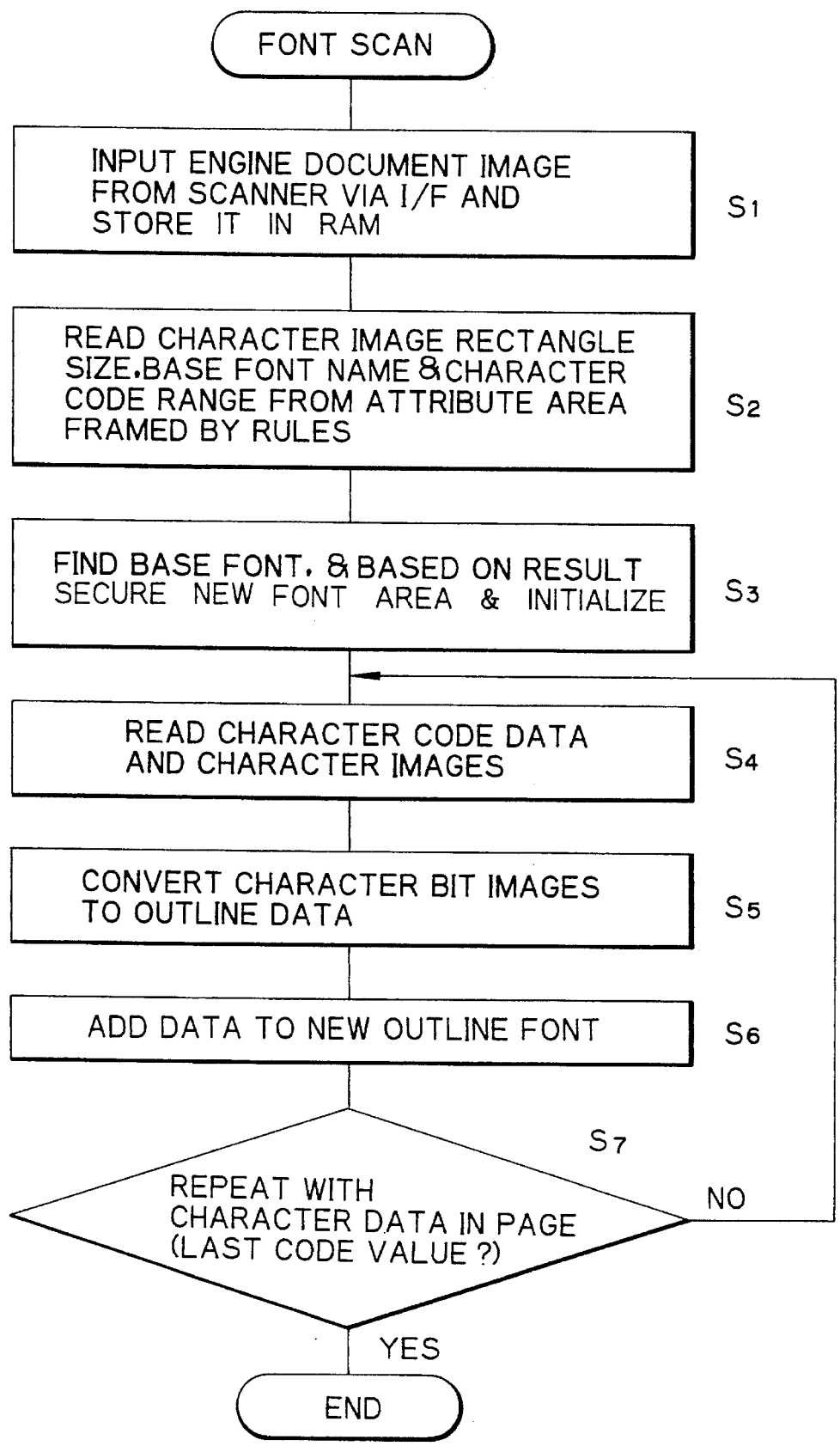
FIG. 17 is a flowchart representative of a font scan procedure of the embodiment of FIG. 15.

FIG. 17 outlines processing for separating only characters from the entire image of a document scanned by the controller, or printer controller, 100 and registering them as a down-loaded font. A specific procedure will be described hereinafter, including the operator's manipulation.

To prepare a document carrying the font registration format, the operator causes the printer to execute a font registration format document printing function thereof by sending a particular command or manipulating the operation panel 110. As shown in FIG. 16, the format is made up of two broad areas each being framed (?) by rules, i.e., the upper attribute area 401 and the lower character pattern data area 402 which is broader than the area 401. In the illustrative embodiment, the attribute area 401 is subdivided into a character pattern size portion, a base font portion, and a character code range portion. The character pattern data area 402 is subdivided into character pattern portions each being accompanied by a character code portion. The attributes, attribute values and character code values are printed by the OCR built in the printer itself. Alternatively, if the printer has a function of recognizing handwritten characters, they may be printed in a general font.

In the character pattern portions of the area 402, the operator draws character patterns or cuts character patterns from printings and then pastes them. It may occur that the size of characters to be registered does not match the size of the character pattern portions. In such a case, the size of characters can be changed on the operation panel 110 or on the host 112. An attribute name (RECTANGLE=) based on such settings is printed in the character pattern size recording portion together with the values thereof. The character pattern portions are divided by rules at horizontal and vertical distances matching the size. When the number of specified characters is too great to be accommodated in one page, they will be printed in a plurality of pages.

The base font whose name is included in the format is a font originally assigned to the printer or fed to the printer from the outside (outline font in the embodiment). During scanning, the printer controller 100 searches for a font of the same name as such a font (outline font) and, if it is present, allows character patterns to be added or changed on the basis of that font. This means that even if character data is allocated to a certain character code of the base font, it is replaced with a new character pattern which the scanner may load with the same code number; if the character code is empty, the new character pattern is added. Specifically, extra characters can be registered at a kanji (Chinese character) font by latter one of the above-mentioned two cases. In addition, part of the existing font may be modified by original characters by use of the scanner. In this case, so long as a font selected by mode setting on, for example, the operation panel 110 is maintained valid at all times, the basic function will be available even if a base font is not designated by reading a document. However, when a font is recorded in a document, it is not necessary for the operator to confirm and/or change the settings since the document has only to be scanned. The character code range is used to determine the range of character codes to be inputted to the printer and the number of frames. This range is also useful to prevent needless character pattern portions from being scanned when, for example, an extra character should be added. After drawing or pasting a desired character pattern on or to a document, the operator sets the document, manipulates the operation panel to prepare the printer for font scanning, and then presses a start button provided on the scanner. Then, the scanner starts scanning the document while sending an image to the printer.

The printer controller 100 starts on processing for registering a scanned font according to a font scan procedure shown in FIG. 17. First, the controller sequentially writes images transferred thereto in a RAM (step S1). Thereafter, the controller separates the rectangular subframes of the attribute area 401 by tracing the rules, tranforms the OCR character sequence to a character code on a subframe basis, and then converts the character code sequence following the symbol "=" or memorizes the character sequence, depending on the name given to the attribute. As a result, with the specific format shown in FIG. 16, the printer controller 100 reads the rectangle size of the character image area, the name of the base font stored in the printer, and the range of character codes (S2). Subsequently, if an outline font of the same name as the base font in the printer is present, the controller copies it in the RAM; if otherwise, the controller secures a new outline font area and sets basic parameters to wait for character data to be inputted (S3). Then, the controller begins to process the character pattern data area 402 from the upper left end of the area 402 in matching relation to the rectangle size of the character images. Specifically, the controller reads the character code in the first character code portion of the area 402 in the same manner as when it reads the attributes of the area 401. Then, the controller separates the bit image of the character pattern portion just below the character code portion along the rules and temporarily copies it in the RAM (S4), produces this contour of the copied bilevel image, divides it into multiple characteristic curves and lines, and approximates them by using, basically, up to the n-th order functions (S5). This kind of processing is generally referred to as outline conversion. The result of outline conversion is added to the initialized new outline font (S6). The controller advances to the next character portion while tracing the rules until the character code reaches the last code value indicated by the character code range (S7). After all the characters have been read, the font is automatically registered. Then, the printer may automatically return to on-line.

Assume that the character-by-character area size is so great, the scan data exceeds one page. Then, the printer waits for the next scanning page by page. This condition is reported to the operator via an LCD. The operator may stop registration halfway or cancel all the data and restart registration by manipulating, for example, the operation panel.

Figure 18:
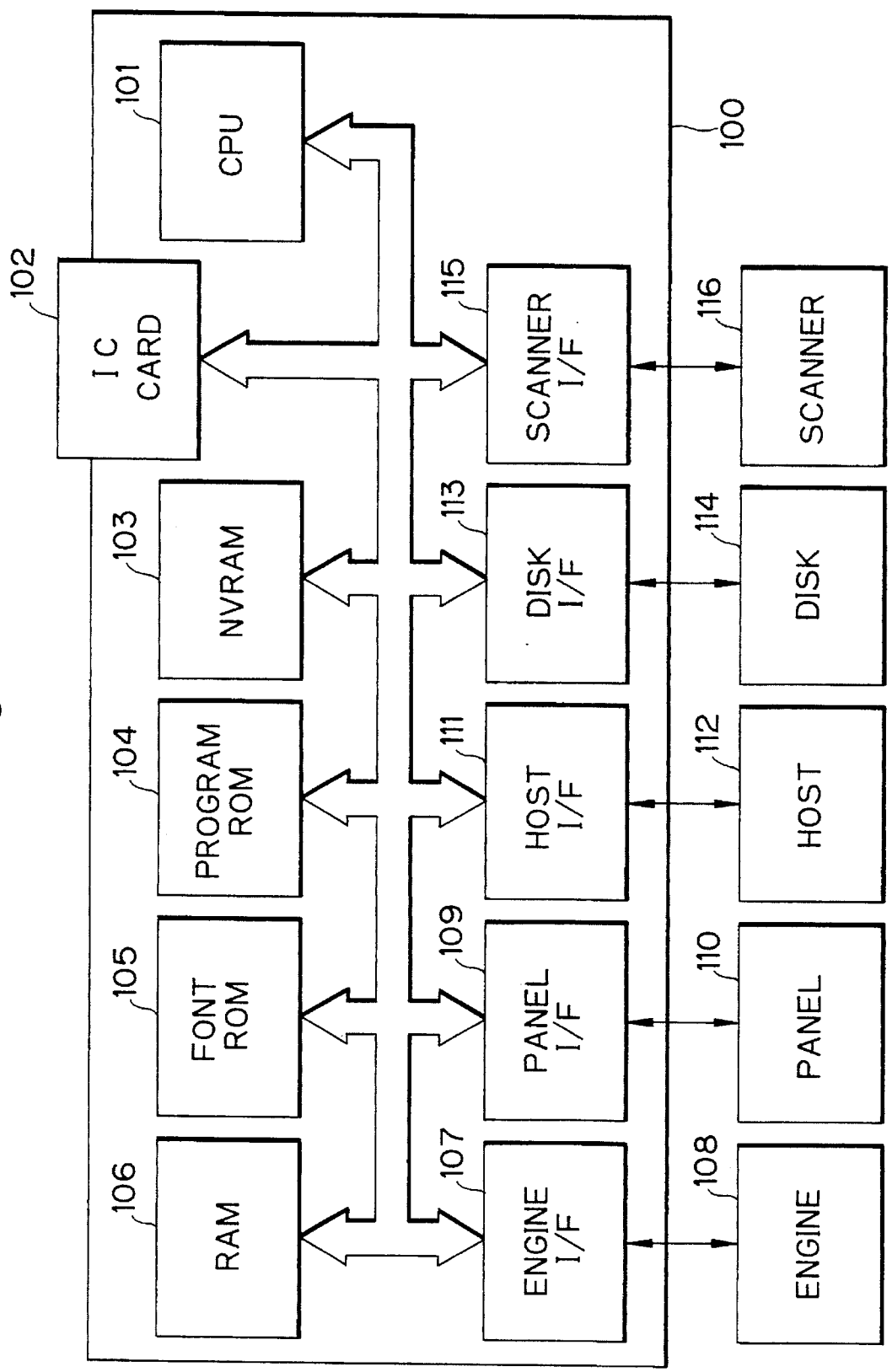
FIG. 18 is a block diagram schematically showing a controller included in an alternative embodiment of the printer in accordance with the present invention.

Referring to FIG. 18, an alternative embodiment of the printer with a scanner in accordance with the present invention will be described. The embodiment of FIG. 18 is essentially similar to that of FIG. 15 except that the disk interface 1113 and disk device 114 shown in FIG. 1 are additionally included. The disk device 114 is an external storage storing font data, programs, print data and so forth and may be implemented as a floppy disk (FDD) or a hard disk (HDD). Usually, the printer controller 100 generates image data in response to print data or control commands from the host 112 and transfers them to the engine 108. Specifically, the host 112 sends print data in the form of character codes and control commands including a polygonal figure command and a font print command or a character code following it. In addition, the control commands may include a control command for filling a polygon or a font with a pattern. In such a case, a fill pattern has to be specified in some form before fill pattern processing. It is a common practice to assign particular identification data (ID) to each fill pattern, designate a particular fill pattern by the ID, and then fill a polygon or a font with the fill pattern by a fill pattern control command.

Figure 19:
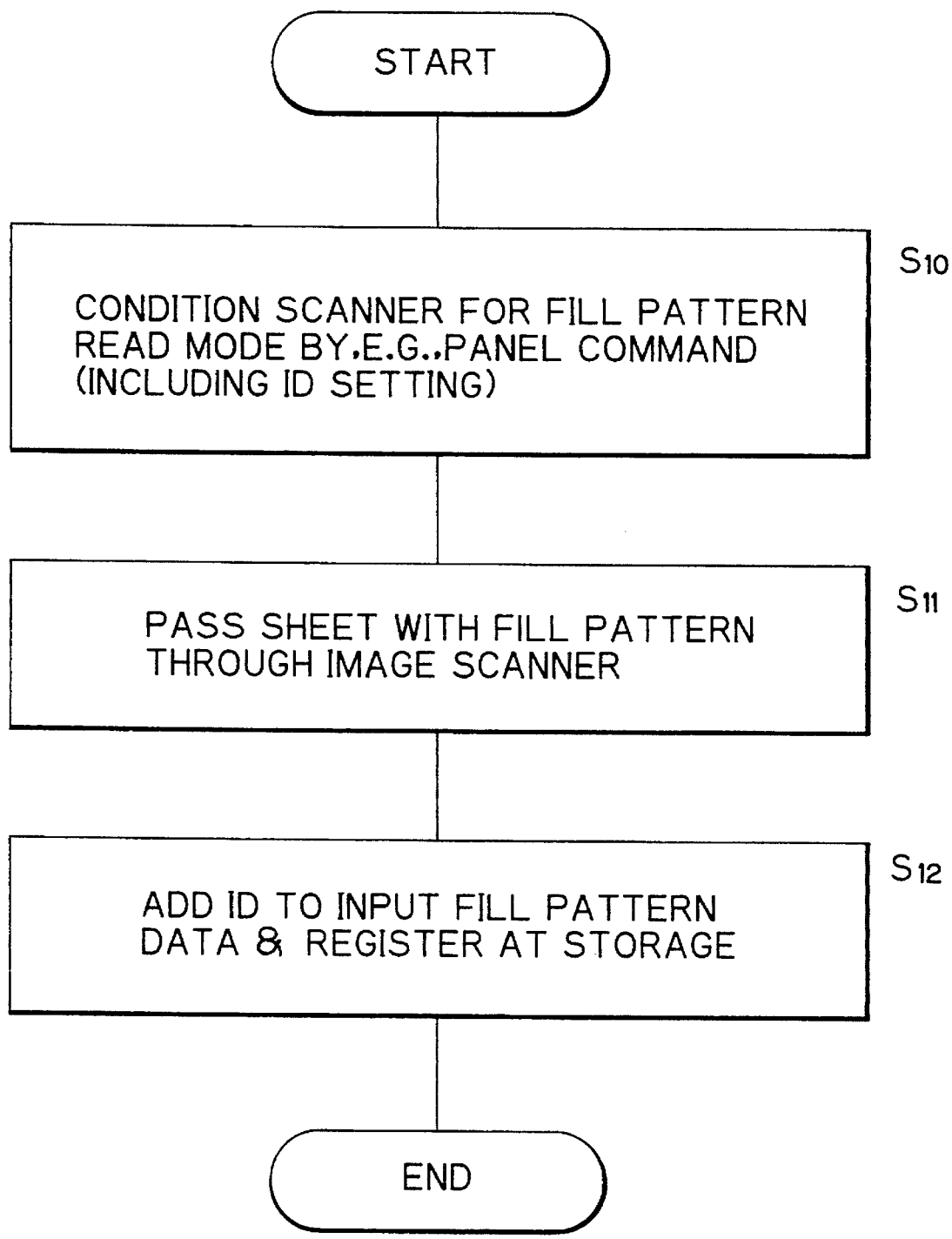
FIG. 19 is a flowchart demonstrating the operator's manipulation and processing by a CPU (Central Processing Unit) to be executed in the same embodiment.

FIG. 19 demonstrates the operator's manipulation for registering a fill pattern and the processing to be executed by the CPU 101, FIG. 18. First, the operator enters a command on the host 112 or the operation panel 110 for conditioning the scanner 116 for a fill pattern read mode and, at the same time, sets the ID of a fill pattern to be registered (step S10). As a sheet on which the operator drew the fill pattern is scanned by the scanner 116, the CPU 101 registers the fill pattern (S11 and S12). Specifically, as the scanner 116 reads the fill pattern, the ID (index) is added to the input fill pattern data and then stored in a storage which may be the RAM 106, NVRAM 103, or disk device 114.

Figure 20:
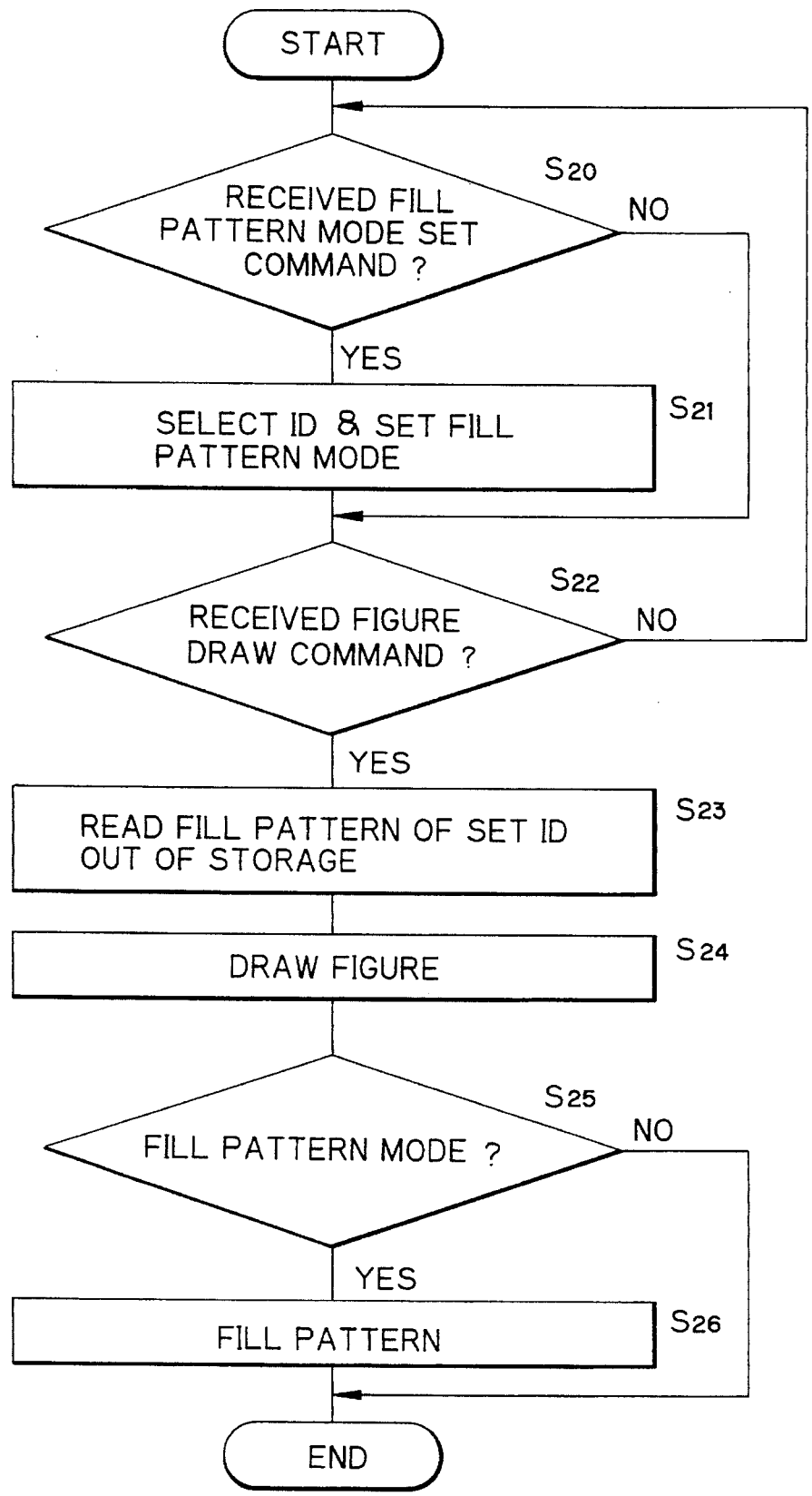
FIG. 20 is a flowchart demonstrating print processing to be executed by the CPU and using a fill pattern.

FIG. 20 shows print processing which the CPU 101 executes with a fill pattern. As shown, the CPU 101 determines whether or not it received a fill pattern mode set command from the host 112 (step S20). If the answer of the step S20 is positive, YES, it selects an ID as instructed by a command from the host 112 or a signal from the operation panel 110 and sets up a fill pattern mode (S21). Then, the CPU 101 determines whether or not it received a character, polygon or similar figure draw command from the host 112 (S22). If the answer of the step S22 is negative, NO, the program returns to the step S20. If it is positive, YES, the CPU 101 reads fill pattern data associated with the ID out of the storage (S23) and then draws a character or a polygon represented by a character code (S24). If a fill pattern mode is not selected, the program ends; if otherwise, the CPU 101 fills the character or polygon with the fill pattern and then ends the processing (S25 and S26).

It is possible to specify a desired range to be recognized as a fill pattern. This can be done if the printer controller 100 indicates the scanner 116 a range to be read. Of course, the range to be read has to be entered beforehand as a signal from the operation panel 110 or a command from the host 116. Further, the fill pattern data fed from the scanner 112 may be enlarged or reduced in the work area of the RAM 106 and then stored in the storage, if desired. Then, a pattern of any desired size will be printed out in the event of pattern filling. In addition, the black and white bits of fill pattern data fed from the scanner 116 may be replaced with each other and then stored in the storage in order to print a reversed black-and-white pattern.

To specify a range to be recognized as a fill pattern as stated above, use may be made of a special format sheet for pattern registration. Specifically, in response to a command from the host 112 or a signal from the operation panel 110, the CPU 101 of the printer controller 100 causes the engine 108 to print a particular range to be recognized as a fill pattern for fill pattern registration on a format sheet. Assume that a mark or similar indication allowing the scanner 116 to see that the format sheet is an exclusive sheet for pattern registration is provided on the format sheet.

The user draws a desired fill pattern to be registered (or pastes a designed fill pattern) on the format sheet, sets it on the scanner 116, and then manipulates the host 112 or the operation panel 110 to cause the scanner 116 to start reading it. Specifically, the CPU 101 causes the scanner 116 to read the format sheet set on the scanner and registers the fill pattern data existing in the marked range in the storage.

Alternatively, use may be made of a format sheet to which an ID in the form of OCR characters is added. In this case, the printer controller 100 causes the engine 108 to produce such a format sheet. As the scanner 116 reads the format sheet, the CPU 101 identifies the ID out of the input image data and then determines a particular ID with which the fill pattern data is to be registered. This allows the ID to be automatically added to the fill pattern data of interest. Hence, a plurality of fill patterns can be drawn on a single format sheet so as to register them at the storage at the same time.

Figure 21:
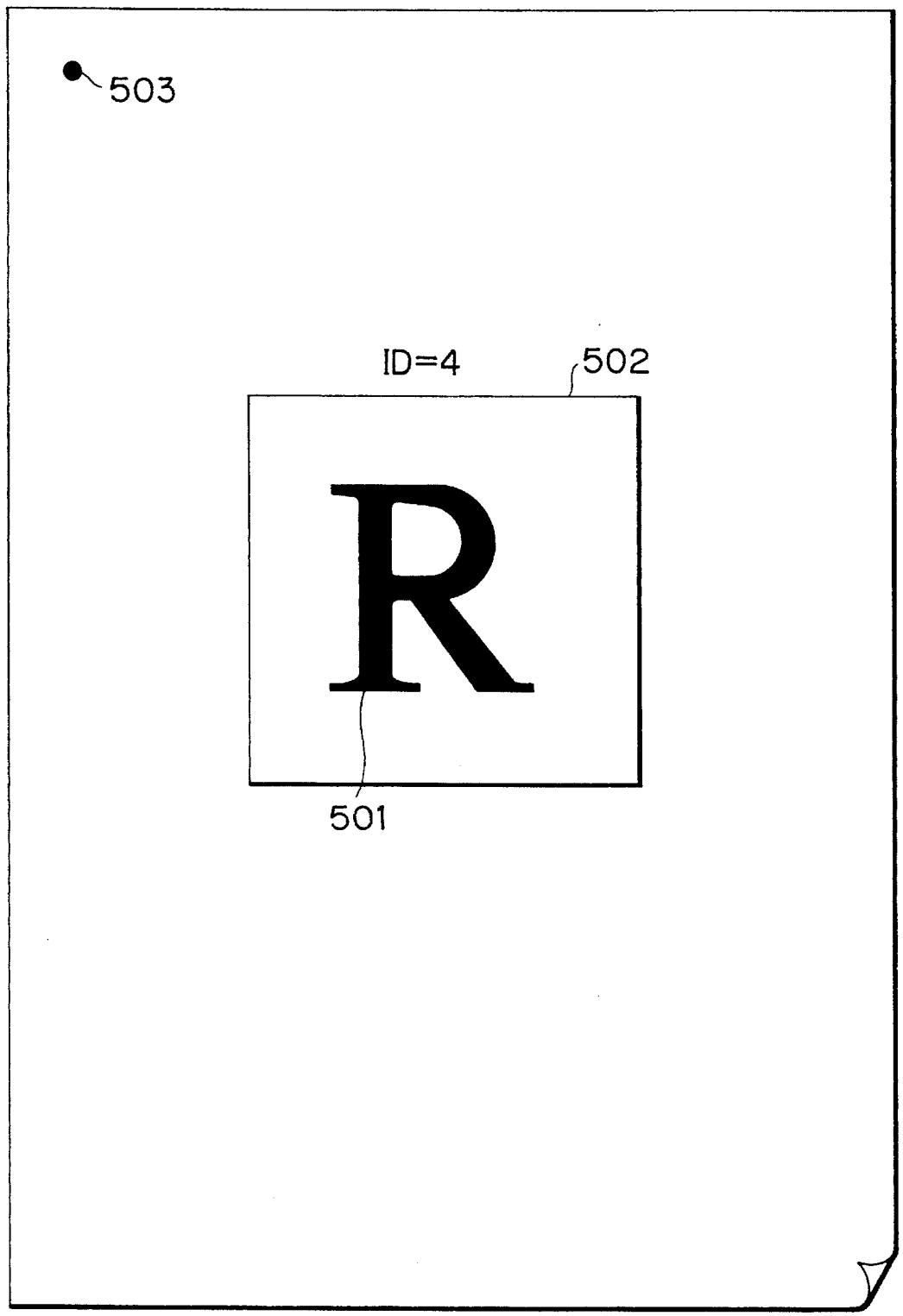
FIG. 21 shows a specific format sheet applicable to the embodiment.
Figure 22:
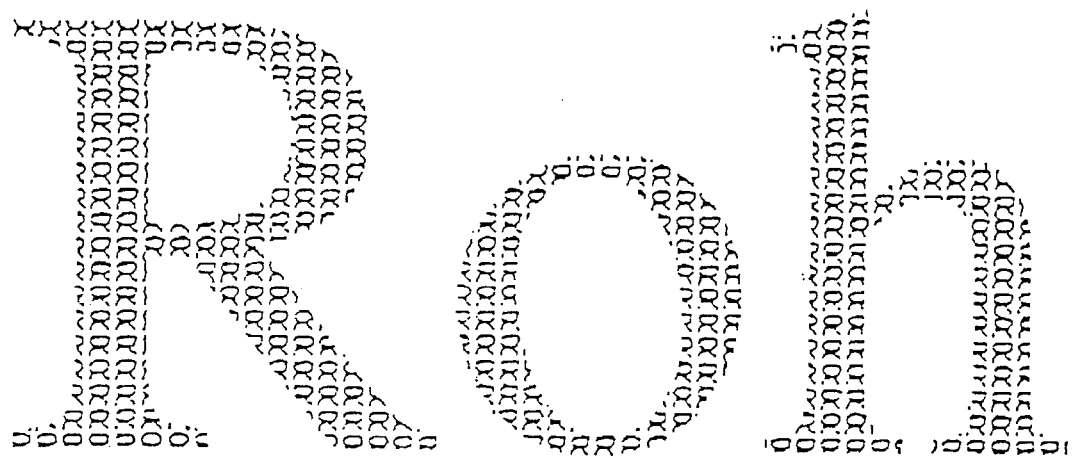
FIGS. 22A and 22B each show a figure filled with the fill pattern of FIG. 21.
Figure 22:
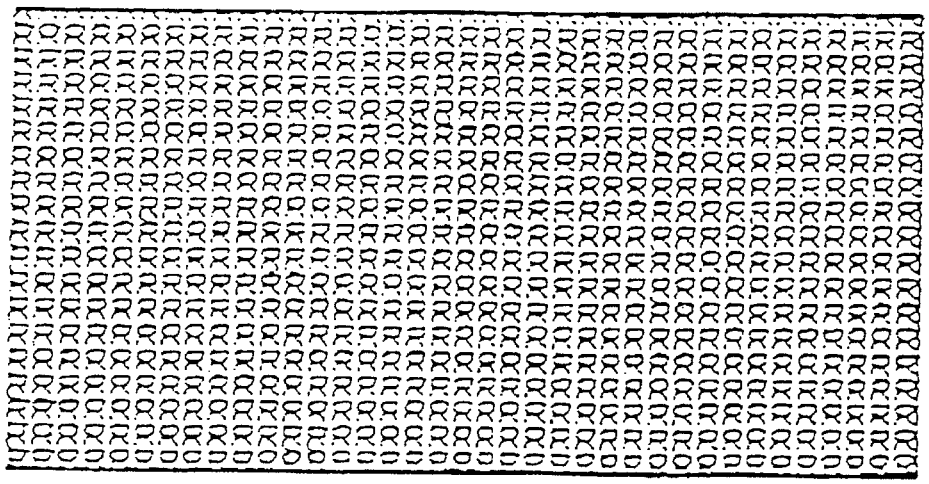

FIG. 21 shows an example of the format sheet for fill pattern registration. As shown, a fill pattern 501, a frame 502 indicative of a range to be recognized as a fill pattern, a marker 503 for the identification of the format sheet, and identification data (ID=4) are printed on the format sheet. FIGS. 22A and 22B each show an exemplary printing filled with the fill pattern 501, i.e., alphabet "R".

While the illustrative embodiment has been shown and described in relation to a controller built in a laser printer, it is also applicable to a facsimile transceiver with a printing function or a complex machine having an image scanner thereinside or to which it is connectable.

In summary, it will be seen that the present invention provides an image forming apparatus with a scanner and a method of controlling it which have various unprecedented advantages, as enumerated below.

(1) A desired image can be combined with an image generated by, for example, a host only if the desired image is set on a scanner.

(2) Since the repetitive development of an image in a nonvolatile video RAM is eliminated, not only the processing time is reduced, but also the range which can be edited is broadened to facilitate the operation. In addition, different images can be combined even when the pixel density for reading differs from the pixel density for image formation.

Also, the present invention provides a printer with a scanner having the following advantages.

(1) Handwritten characters, personal designed characters, types ready to hand, letterings and so forth can be loaded in the printer without resorting to a special program of a host or font data. Such characters can be printed in response to character codes from the host.

(2) The contour of a bilevel image from the scanner is divided, approximated by the n-th order curves or lines, and then stored as an outline font. This corrects contours deformed by irregularities particular to handwriting and noise and allows the original pattern to be freely scaled, compared to a case using a bit map font.

(3) If the layout for the operator to write a character pattern and for the scanner to read it is fixed, the program in which a printer controller reads a font pattern is further simplified. This allows a greater number of characters to be laid out and read by a single scanning.

(4) A particular pattern portion can be assigned to one character of a font registration format document. Hence, the character size always matches the character pattern portion, and a character can be read in a desired size.

(5) Data read by the scanner can be added to or substituted for a particular character of an existing font. Therefore, extra characters can be registered more simply than in the case wherein such characters are generated and registered on a host.

(6) As the printer identifies attributes by reading a document, the operator does not have to operate an operation panel for entering attributes. Moreover, this eliminates erroneous operations and saves time and labor for confirmation.

(7) Since image data from the image scanner is usable as fill pattern data, a fill pattern can be readily generated even with a handwritten character. This enhances the quality of documents.

Various modifications will become possible for those skilled in the art after receiving the teachings of the present disclosure without departing from the scope thereof.

What is claimed is:

1. A printer with a scanner for receiving a character code, a control command or similar data from a host and printing said data, comprising:

registering means capable of receiving image data from a scanner built in or connected to said printer and storing said image data in a storage as fill pattern data which will be used to draw graphics;

filling means for filling a figure with said fill pattern data registered by said registering means; and marking means for specifying a range of the image data from said scanner which is to be recognized as said fill pattern, and wherein said range of the image data can be inserted into any position of the figure.

2. A printer as claimed in claim 1, further comprising adding means for adding identification data to said fill pattern data to be registered.

3. A printer as claimed in claim 1, further comprising specifying means for specifying an enlargement ratio or a reduction ratio of said fill pattern data to be registered.

4. A printer as claimed in claim 1, further comprising reversing means for reversing said fill pattern data to be registered with respect to black and white.

5. A printer as claimed in claim 1, further comprising format sheet print control means for causing a printer engine to print a format sheet indicating a range to be recognized as a fill pattern.

6. A printer as claimed in claim 5, wherein said format sheet print control means comprises:

first adding means for adding identification data in the form of OPC characters to a format sheet; and second adding means for causing said scanner to read said format sheet to read said identification data and automatically adding said identification data to said fill pattern data to be registered.

* * * * *